United States Patent
Niergarth et al.

(10) Patent No.: US 11,946,437 B2
(45) Date of Patent: *Apr. 2, 2024

(54) VARIABLE PITCH FANS FOR TURBOMACHINERY ENGINES

(71) Applicant: General Electric Company, Schenectady, NY (US)

(72) Inventors: Daniel A. Niergarth, Norwood, OH (US); Martin Manning, Cincinnati, OH (US); Nicholas M. Daggett, Camden, ME (US); Christopher J. Kroger, West Chester, OH (US); Ian F. Prentice, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,438

(22) Filed: Aug. 12, 2022

(65) Prior Publication Data
US 2023/0126551 A1    Apr. 27, 2023

Related U.S. Application Data

(63) Continuation-in-part of application No. 17/176,101, filed on Feb. 15, 2021, now Pat. No. 11,454,195.

(51) Int. Cl.
*F02K 3/06*        (2006.01)
*F01D 7/00*        (2006.01)
(Continued)

(52) U.S. Cl.
CPC .............. *F02K 3/06* (2013.01); *F02K 3/072* (2013.01); *F04D 29/362* (2013.01); *F01D 7/00* (2013.01);
(Continued)

(58) Field of Classification Search
None
See application file for complete search history.

(56) References Cited

U.S. PATENT DOCUMENTS 5,199,850 A * 4/1993 Carvalho ............. B64C 11/325
                                               416/165
7,901,185 B2   3/2011 Suciu et al.
(Continued)

FOREIGN PATENT DOCUMENTS

EP    3 168 480 A1    5/2017
EP    3 067 566 B1    8/2018
(Continued)

OTHER PUBLICATIONS

Edkins et al., "TF34 Turbofan Quiet Engine Study Final Report," NASA CR-120914, Dec. 31, 1972, retrieved on May 23, 2022 from https://ntrs.nasa.gov/citations/19720026093.
(Continued)

*Primary Examiner* — Christopher Verdier
(74) *Attorney, Agent, or Firm* — Klarquist Sparkman, LLP

(57) ABSTRACT

A turbomachinery engine can include a fan assembly with a plurality of variable pitch fan blades. The fan blades are configured such that they define a first VPF parameter and a second VPF parameter. The first VPF parameter is within a range of 0.10 to 0.40 and is defined as the hub-to-tip radius ratio divided by the fan pressure ratio. The second VPF parameter is within a range of 1-30 lbf/in$^2$ and is defined as the bearing spanwise force divided by the fan area. In certain examples, the turbomachinery engine further includes a pitch change mechanism, a vane assembly, a core engine, and a gearbox.

20 Claims, 31 Drawing Sheets

(51) Int. Cl.
    *F02K 3/072*     (2006.01)
    *F02K 3/075*     (2006.01)
    *F02K 3/077*     (2006.01)
    *F04D 29/36*     (2006.01)

(52) U.S. Cl.
    CPC .............. *F02K 3/075* (2013.01); *F02K 3/077* (2013.01); *F05D 2220/36* (2013.01); *F05D 2260/40311* (2013.01); *F05D 2260/74* (2013.01)

(56) References Cited

U.S. PATENT DOCUMENTS

| | | | |
|---|---|---|---|
| 8,998,577 | B2 | 4/2015 | Gustafson et al. |
| 10,072,510 | B2 | 9/2018 | Miller et al. |
| 10,288,083 | B2 | 5/2019 | Miller et al. |
| 10,618,667 | B2 | 4/2020 | Keller et al. |
| 11,454,195 | B2 * | 9/2022 | Niergarth .................. F02K 3/02 |
| 2017/0122119 | A1 * | 5/2017 | Niergarth .................. F02C 7/00 |
| 2017/0138207 | A1 * | 5/2017 | Niergarth .................. F02K 3/06 |
| 2017/0218975 | A1 | 8/2017 | Bintz et al. |
| 2021/0108597 | A1 | 4/2021 | Ostdiek et al. |
| 2022/0042461 | A1 | 6/2022 | Molesini et al. |

FOREIGN PATENT DOCUMENTS

| | | |
|---|---|---|
| EP | 3 597 896 A1 | 1/2020 |
| EP | 3 135 922 B1 | 3/2020 |
| FR | 3 046 438 A1 | 7/2017 |

OTHER PUBLICATIONS

General Electric Company, "Quiet Clean Short-Haul Experimental Engine (QC-SEE)—Under-the-Wing (LJTW) Final Design Report," Jun. 1, 1977, retrieved on May 23, 2022 from https://ntrs.nasa.gov/citations/19800075257.

Shaefer et al., Dynamics of High-Bypass-Engine Thrust Reversal Using a Variable-Pitch Fan. No. NASA-TM-X-3524, May 1, 1977.

* cited by examiner

| ENGINE | ENGINE TYPE | FAN BLADES | FAN TIP SPEED (ft/s) | FAN RADIUS RATIO ("RR") | FAN PRESSURE RATIO ("FPR") | FAN CENTER OF GRAVITY (in) | FAN REDLINE SPEED (rad/s) | FAN MASS (lbm) | F_SPAN (lbf) | FAN_AREA (in²) | RR/FPR | F_SPAN/ FAN_AREA (lbf/in²) |
|---|---|---|---|---|---|---|---|---|---|---|---|---|
| 1 | DUCTED | 12 | 1200 | 0.43 | 1.35 | 32.5 | 286.3 | 25.1 | 172797 | 7000 | 0.32 | 24.69 |
| 2 | DUCTED | 12 | 1200 | 0.33 | 1.35 | 27.7 | 299.5 | 23.2 | 149303 | 7000 | 0.24 | 21.33 |
| 3 | DUCTED | 12 | 800 | 0.30 | 1.25 | 26.2 | 202.1 | 15 | 41601 | 7000 | 0.24 | 5.94 |
| 4 | DUCTED | 12 | 800 | 0.25 | 1.25 | 24.5 | 204.7 | 14.7 | 38864 | 7000 | 0.2 | 5.55 |
| 5 | DUCTED | 12 | 1200 | 0.42 | 1.3 | 24 | 381.2 | 7.5 | 68277 | 4000 | 0.32 | 17.07 |
| 6 | DUCTED | 12 | 1200 | 0.33 | 1.3 | 20.9 | 396.2 | 6 | 51022 | 4000 | 0.25 | 12.76 |
| 7 | DUCTED | 12 | 1050 | 0.38 | 1.3 | 30 | 256.7 | 22.4 | 114697 | 7000 | 0.29 | 16.39 |
| 8 | DUCTED | 12 | 1050 | 0.29 | 1.35 | 25.8 | 266 | 17.9 | 84608 | 7000 | 0.22 | 12.09 |
| 9 | DUCTED | 12 | 1050 | 0.40 | 1.35 | 27.2 | 287.7 | 15 | 87567 | 5500 | 0.29 | 15.92 |
| 10 | DUCTED | 12 | 1050 | 0.31 | 1.25 | 23.7 | 298 | 12 | 65378 | 5500 | 0.23 | 11.89 |
| 11 | DUCTED | 12 | 950 | 0.32 | 1.25 | 27.2 | 238 | 15.3 | 60856 | 7000 | 0.26 | 8.69 |
| 12 | DUCTED | 12 | 950 | 0.25 | 1.25 | 24.5 | 243 | 12.5 | 46630 | 7000 | 0.2 | 6.66 |
| 13 | DUCTED | 12 | 1100 | 0.36 | 1.25 | 28.8 | 284.2 | 15.6 | 94101 | 7000 | 0.28 | 13.44 |
| 14 | DUCTED | 12 | 1100 | 0.28 | 1.25 | 25.4 | 292.3 | 12.6 | 70888 | 7000 | 0.22 | 10.13 |
| 15 | DUCTED | 12 | 1150 | 0.41 | 1.35 | 30.4 | 287.4 | 21.3 | 138409 | 6500 | 0.31 | 21.29 |
| 16 | DUCTED | 12 | 1150 | 0.32 | 1.35 | 26 | 299.5 | 16.9 | 101901 | 6500 | 0.23 | 15.68 |
| 17 | DUCTED | 14 | 1200 | 0.47 | 1.35 | 34.6 | 279.9 | 26 | 182593 | 7000 | 0.35 | 26.08 |
| 18 | DUCTED | 16 | 1200 | 0.45 | 1.35 | 33.5 | 283.2 | 21.9 | 152296 | 7000 | 0.33 | 21.76 |
| 19 | DUCTED | 12 | 1200 | 0.48 | 1.35 | 35 | 278.8 | 19.6 | 138080 | 7000 | 0.35 | 19.73 |
| 20 | DUCTED | 14 | 800 | 0.34 | 1.25 | 27.9 | 199.3 | 15.4 | 44210 | 7000 | 0.27 | 6.32 |
| 21 | DUCTED | 12 | 800 | 0.31 | 1.25 | 26.9 | 200.9 | 13 | 36626 | 7000 | 0.25 | 5.23 |
| 22 | DUCTED | 14 | 1200 | 0.46 | 1.3 | 25.6 | 373.1 | 7.8 | 72183 | 4000 | 0.35 | 18.05 |
| 23 | DUCTED | 12 | 1200 | 0.44 | 1.3 | 24.9 | 377 | 6.6 | 60285 | 4000 | 0.34 | 15.07 |
| 24 | DUCTED | 16 | 1200 | 0.47 | 1.3 | 26 | 371.3 | 5.9 | 54727 | 4000 | 0.36 | 13.68 |

FIG. 25

| ENGINE | ENGINE TYPE | FAN BLADES | FAN TIP SPEED (ft/s) | FAN RADIUS RATIO ("RR") | FAN PRESSURE RATIO ("FPR") | FAN CENTER OF GRAVITY (in) | FAN REDLINE SPEED (rad/s) | FAN MASS (lbm) | F_SPAN (lbf) | FAN_AREA (in²) | RR/FPR | F_SPAN/ FAN_AREA (lbf/in²) |
|---|---|---|---|---|---|---|---|---|---|---|---|---|
| 25 | UNDUCTED | 12 | 805 | 0.26 | 1.07 | 39.4 | 128.8 | 48.1 | 81293 | 17851 | 0.24 | 4.55 |
| 26 | UNDUCTED | 12 | 805 | 0.22 | 1.07 | 36.8 | 130.1 | 47.1 | 76038 | 17851 | 0.2 | 4.26 |
| 27 | UNDUCTED | 12 | 805 | 0.16 | 1.07 | 33.7 | 131.5 | 46 | 69397 | 17851 | 0.15 | 3.89 |
| 28 | UNDUCTED | 10 | 735 | 0.42 | 1.08 | 43.1 | 126 | 22.5 | 39632 | 12751 | 0.39 | 3.11 |
| 29 | UNDUCTED | 8 | 735 | 0.41 | 1.08 | 42.6 | 126 | 21.5 | 37459 | 12879 | 0.38 | 2.91 |
| 30 | UNDUCTED | 14 | 760 | 0.29 | 1.07 | 38.4 | 118 | 40.0 | 55219 | 17275 | 0.27 | 3.20 |
| 31 | UNDUCTED | 12 | 760 | 0.29 | 1.07 | 38.8 | 118 | 45.5 | 63335 | 17275 | 0.27 | 3.67 |
| 32 | UNDUCTED | 14 | 798 | 0.27 | 1.07 | 35.6 | 128 | 45.5 | 68624 | 16296 | 0.25 | 4.21 |
| 33 | UNDUCTED | 12 | 702 | 0.27 | 1.07 | 33.5 | 122 | 41.7 | 53989 | 13875 | 0.25 | 3.89 |
| 34 | UNDUCTED | 12 | 684 | 0.27 | 1.07 | 46.0 | 90 | 65.3 | 62910 | 24203 | 0.25 | 2.60 |
| 35 | UNDUCTED | 14 | 684 | 0.27 | 1.07 | 41.8 | 96 | 43.3 | 43464 | 21142 | 0.25 | 2.06 |
| 36 | UNDUCTED | 12 | 798 | 0.27 | 1.07 | 38.4 | 115 | 48.5 | 63279 | 20319 | 0.25 | 3.11 |
| 37 | UNDUCTED | 12 | 798 | 0.27 | 1.07 | 41.5 | 107 | 58.6 | 71421 | 23508 | 0.25 | 3.04 |

FIG. 26

VARIABLE PITCH FANS FOR TURBOMACHINERY ENGINES

CROSS REFERENCE TO RELATED APPLICATION

This application is a continuation-in-part of U.S. patent application Ser. No. 17/176,101, filed Feb. 15, 2021, now U.S. Pat. No. 11,454,195. The prior application is incorporated by reference.

FIELD

This disclosure relates generally to turbomachinery engines including fan assemblies and, in particular, to apparatus and methods of directed to variable pitch fans for certain turbomachinery engine configurations.

BACKGROUND

A turbofan engine includes a core engine that drives a bypass fan. The bypass fan generates the majority of the thrust of the turbofan engine. The generated thrust can be used to move a payload (e.g., an aircraft).

In some instances, a turbofan engine is configured as a direct drive engine. Direct drive engines are configured such that a power turbine (e.g., a low-pressure turbine) of the core engine is directly coupled to the bypass fan. As such, the power turbine and the bypass fan rotate at the same rotational speed (i.e., the same rpm).

In other instances, a turbofan engine can be configured as a geared engine. Geared engines include a gearbox disposed between and interconnecting the bypass fan and power turbine of the core engine. The gearbox, for example, allows the power turbine of the core engine to rotate at a different speed than the bypass fan. Thus, the gearbox can, for example, allow the power turbine of the core engine and the bypass fan to operate at their respective rotational speeds for maximum efficiency and/or power production.

In some instances, a propulsor of a turbomachinery engine can be a fan encased within a fan case and/or nacelle. This type of turbomachinery engine can be referred to as "a ducted engine."

In other instances, a propulsor of a turbomachinery engine can be exposed (e.g., not within a fan case or a nacelle). This type of turbomachinery engine can be referred to as "an open rotor engine" or an "unducted engine."

In some instances, a turbofan engine can comprise a fixed pitch fan, which typical in commercial engines. In such configuration, the pitch of the fan is static and configured to accommodate various engine operating conditions (e.g., takeoff, climb, cruise, approach, etc.).

In other instances, a turbofan engine can include a variable pitch fan. In such configurations, the pitch (or blade angle) of the fan can be adjusted to improve propulsive efficiency as the engine operating conditions change.

Despite certain advantages, engines comprising a gearbox and/or a variable pitch fan can have one or more drawbacks. For example, including a gearbox and/or a variable pitch fan in a turbofan engine introduces additional complexity to the engine. This can, for example, make engine development and/or manufacturing significantly more difficult. As such, there is a need for improved turbofan engines comprising a gearbox and/or a variable pitch fan. There is also a need for devices and methods that can be used to develop and manufacture geared turbofan engines with variable pitch fans more efficiently and/or precisely.

BRIEF DESCRIPTION

Aspects and advantages of the disclosed technology will be set forth in part in the following description, or may be obvious from the description, or may be learned through practice of the technology disclosed in the description.

Various turbomachinery engines and gear assemblies are disclosed herein. The disclosed turbomachinery engines comprise a variable pitch fan ("VPF"). The disclosed engines can also comprise a gearbox in some configurations. The disclosed variable pitch fans are characterized by a plurality of fan parameters including a first VPF parameter defined as the hub-to-tip radius ratio ("RR") divided by the fan pressure ratio ("FPR") and a second VPF parameter defined as the bearing spanwise force ("F_span") divided by the fan area ("F_area"). The disclosed VPF parameters may also be used, for example, to aid the development of variable pitch fans and/or other engine configurations. The VPF parameters thus provide improved variable pitch fans and/or can help simplify one or more complexities of variable pitch fans and/or geared turbomachinery engine development.

In some examples, a turbomachinery engine includes a fan assembly including a plurality of fan blades. The fan blades are configured such that they define a first VPF parameter and a second VPF parameter. In some instances, the first VPF parameter is within a range of 0.10 to 0.40, and the second VPF parameter is within a range of 1-30 lbf/in². In some examples, the turbomachinery engine further includes a pitch change mechanism, a vane assembly, a core engine, and a gearbox. The pitch change mechanism is coupled to the plurality of fan blades and configured for adjusting a pitch of the plurality of fan blades. The vane assembly includes a plurality of vanes disposed aft of the fan blades. The core engine includes one or more compressor sections and one or more turbine sections. The gearbox includes an input and an output. The input is coupled to the one or more turbine sections of the core engine and comprises a first rotational speed, and the output is coupled to the fan assembly and has a second rotational speed, which is less than the first rotational speed.

These and other features, aspects, and/or advantages of the present disclosure will become better understood with reference to the following description and the claims. The accompanying drawings, which are incorporated in and constitute a part of this specification, illustrate embodiments of the disclosed technology and, together with the description, serve to explain the principles of the disclosure.

BRIEF DESCRIPTION OF THE DRAWINGS

FIG. 25 depicts various fan parameters of several exemplary turbomachinery engines comprising ducted variable pitch fans.

FIG. 26 depicts various fan parameters of several exemplary turbomachinery engines comprising unducted variable pitch fans.

DETAILED DESCRIPTION

Figure 1:
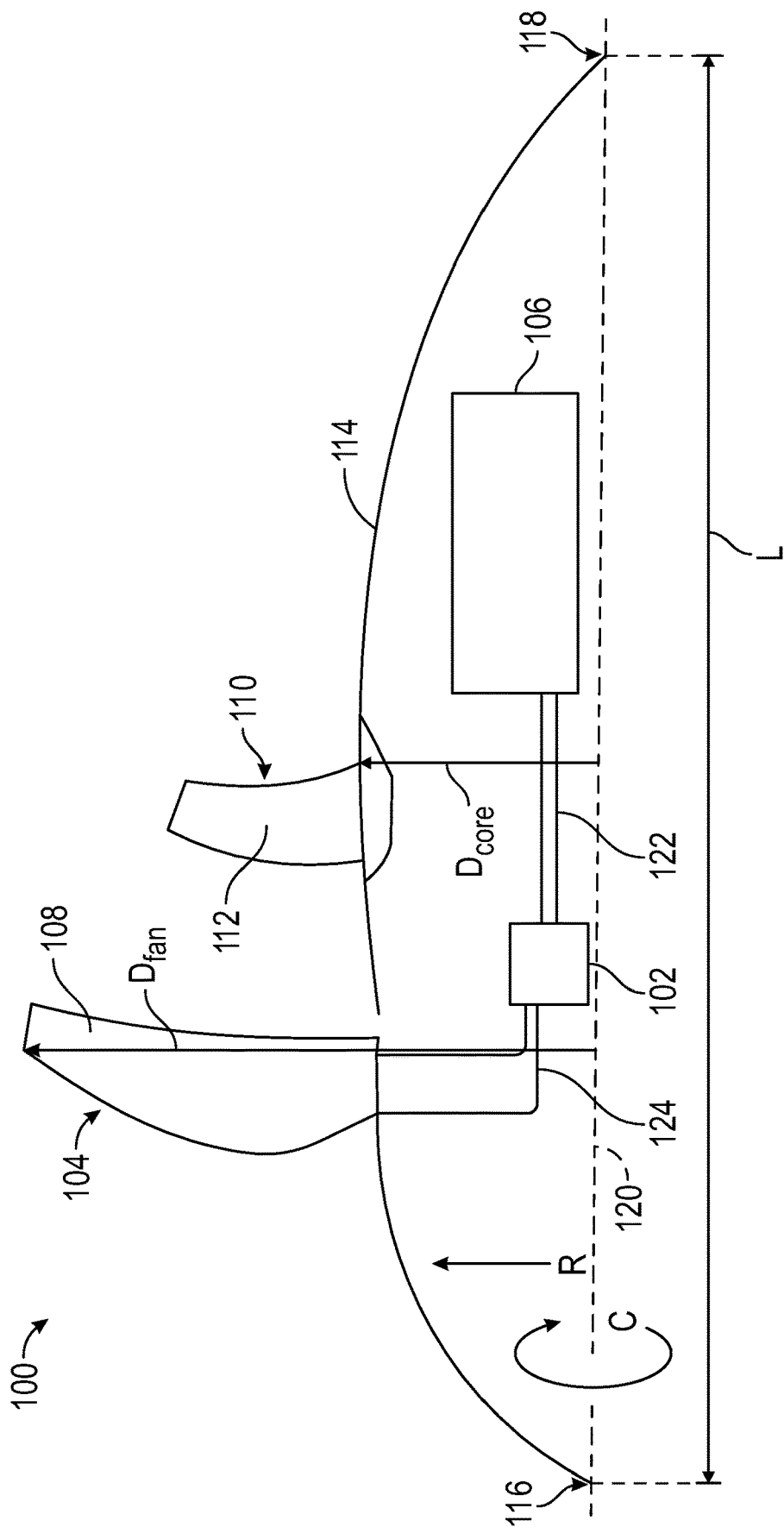
FIG. 1 depicts a cross-sectional schematic illustration of an exemplary embodiment of a turbomachinery engine configured with an open rotor propulsion system and a variable pitch fan.

Reference now will be made in detail to embodiments of the disclosed technology, one or more examples of which are illustrated in the drawings. Each example is provided by way of explanation of the disclosed technology, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, ranges of values are combinable and interchangeable, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 is an exemplary embodiment of an engine 100 including a gear assembly 102 according to aspects of the present disclosure. The engine 100 includes a fan assembly 104 driven by a core engine 106. In various embodiments, the core engine 106 is a Brayton cycle system configured to drive the fan assembly 104. The core engine 106 is shrouded, at least in part, by an outer casing 114. The fan assembly 104 includes a plurality of fan blades 108. A vane assembly 110 extends from the outer casing 114 in a cantilevered manner. Thus, the vane assembly 110 can also be referred to as an unducted vane assembly. The vane assembly 110, including a plurality of vanes 112, is positioned in operable arrangement with the fan blades 108 to provide thrust, control thrust vector, abate or re-direct undesired acoustic noise, and/or otherwise desirably alter a flow of air relative to the fan blades 108.

In some embodiments, the fan assembly 104 includes eight (8) to twenty-six (26) fan blades 108. In particular embodiments, the fan assembly 104 includes ten (10) to twenty-two (22) fan blades 108. In certain embodiments, the fan assembly 104 includes twelve (12) to eighteen (18) fan blades 108. In some embodiments, the vane assembly 110 includes three (3) to thirty (30) vanes 112. In certain embodiments, the vane assembly 110 includes an equal or fewer quantity of vanes 112 to fan blades 108. For example, in particular embodiments, the engine 100 includes twelve (12) fan blades 108 and ten (10) vanes 112. In other embodiments, the vane assembly 110 includes a greater quantity of vanes 112 to fan blades 108. For example, in particular embodiments, the engine 100 includes ten (10) fan blades 108 and twenty-three (23) vanes 112. In another particular embodiment, the engine includes fourteen (14) fan blades.

In certain embodiments, such as depicted in FIG. 1, the vane assembly 110 is positioned downstream or aft of the fan assembly 104. However, it should be appreciated that in some embodiments, the vane assembly 110 may be positioned upstream or forward of the fan assembly 104. In still various embodiments, the engine 100 may include a first vane assembly positioned forward of the fan assembly 104 and a second vane assembly positioned aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

In certain embodiments, such as depicted in FIG. 1, the engine 100 is an un-ducted thrust producing system, such that the plurality of fan blades 108 is unshrouded by a nacelle or fan casing. As such, in various embodiments, the engine 100 may be configured as an unshrouded turbofan engine, an open rotor engine, or a propfan engine. In particular embodiments, the engine 100 is an unducted rotor engine with a single row of fan blades 108. The fan blades 108 can have a large diameter, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds.

The fan blades 108 comprise a diameter ($D_{fan}$). It should be noted that for purposes of illustration only half of the $D_{fan}$ is shown (i.e., the radius of the fan). In some embodiments, the $D_{fan}$ is 72-216 inches. In particular embodiments the $D_{fan}$ is 100-200 inches. In certain embodiments, the $D_{fan}$ is 120-190 inches. In other embodiments, the $D_{fan}$ is 72-120 inches. In other embodiments, the $D_{fan}$ is 80-100 inches. In yet other embodiments, the $D_{fan}$ is 50-80 inches.

In some embodiments, the fan blade tip speed at a cruise flight condition can be 650 to 900 fps, or 700 to 800 fps. A fan pressure ratio (FPR) for the fan assembly 104 can be 1.04 to 1.10, or in some embodiments 1.05 to 1.08, as measured across the fan blades at a cruise flight condition. In other examples, a fan pressure ratio for the fan assembly can be 1.05-1.5 (or 1.05-1.15 or 1.2-1.4) as measured at a static sea-level takeoff operating condition.

Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft. and approximately 45,000 ft. In still certain embodiments, cruise altitude is expressed in flight levels (FL) based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea-level pressure of approximately 14.70 psia and sea-level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea-level pressure and/or sea-level temperature.

The core engine 106 is generally encased in outer casing 114 defining one half of a core diameter ($D_{core}$), which may be thought of as the maximum extent from the centerline axis (datum for R). In certain embodiments, the engine 100 includes a length (L) from a longitudinally (or axial) forward end 116 to a longitudinally aft end 118. In various embodiments, the engine 100 defines a ratio of $L/D_{core}$ that provides for reduced installed drag. In one embodiment, $L/D_{core}$ is at least 2. In another embodiment, $L/D_{core}$ is at least 2.5. In some embodiments, the $L/D_{core}$ is less than 5, less than 4, and less than 3. In various embodiments, it should be appreciated that the $L/D_{core}$ is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the $L/D_{core}$, the fan assembly 104, and/or the vane assembly 110 separately or together configure, at least in part, the engine 100 to operate at a maximum cruise altitude operating speed between approximately Mach 0.55 and approximately Mach 0.85; or between approximately 0.72 to 0.85 or between approximately 0.75 to 0.85.

Referring still to FIG. 1, the core engine 106 extends in a radial direction (R) relative to an engine centerline axis 120. The gear assembly 102 receives power or torque from the core engine 106 through a power input source 122 and provides power or torque to drive the fan assembly 104, in a circumferential direction C about the engine centerline axis 120, through a power output source 124.

The gear assembly 102 of the engine 100 can include a plurality of gears, including an input and an output. The gear assembly can also include one or more intermediate gears disposed between and/or interconnecting the input and the output. The input can be coupled to a turbine section of the core engine 106 and can comprise a first rotational speed. The output can be coupled to the fan assembly and can have a second rotational speed. In some embodiments, a gear ratio of the first rotational speed to the second rotational speed is greater than 4.1 (e.g., within a range of 4.1-14.0).

The gear assembly 102 (which can also be referred to as "a gearbox") can comprise various types and/or configuration. For example, in some embodiments, the gearbox is an epicyclic gearbox configured in a star gear configuration. Star gear configurations comprise a sun gear, a plurality of star gears (which can also be referred to as "planet gears"), and a ring gear. The sun gear is the input and is coupled to the power turbine (e.g., the low-pressure turbine) such that the sun gear and the power turbine rotate at the same rotational speed. The star gears are disposed between and interconnect the sun gear and the ring gear. The star gears are rotatably coupled to a fixed carrier. As such, the star gears can rotate about their respective axes but cannot collectively orbit relative to the sun gear or the ring gear. As another example, the gearbox is an epicyclic gearbox configured in a planet gear configuration. Planet gear configurations comprise a sun gear, a plurality of planet gears, and a ring gear. The sun gear is the input and is coupled to the power turbine. The planet gears are disposed between and interconnect the sun gear and the ring gear. The planet gears are rotatably coupled to a rotatable carrier. As such, the planet gears can rotate about their respective axes and also collectively rotate together with the carrier relative to the sun gear and the ring gear. The carrier is the output and is coupled to the fan assembly. The ring gear is fixed from rotation.

Figure 9:
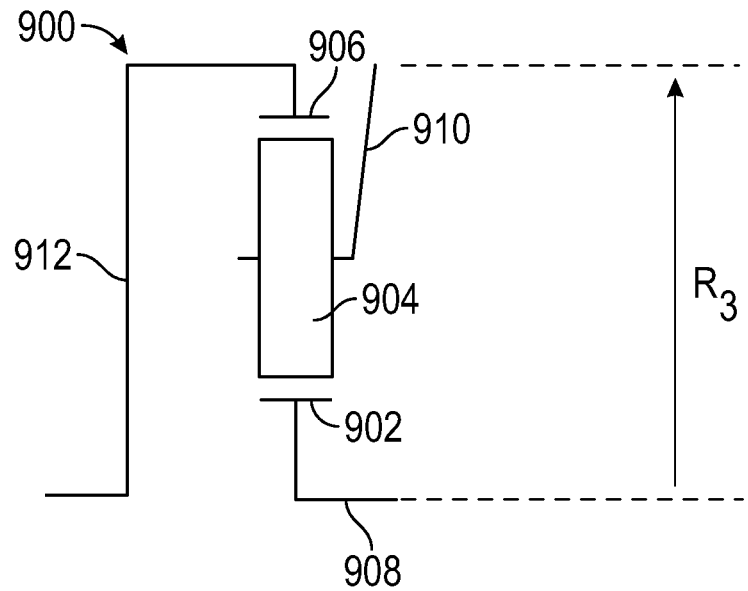
FIG. 9 depicts a cross-sectional schematic illustration of an exemplary embodiment of a gearbox configuration for a turbomachinery engine.
Figure 10:
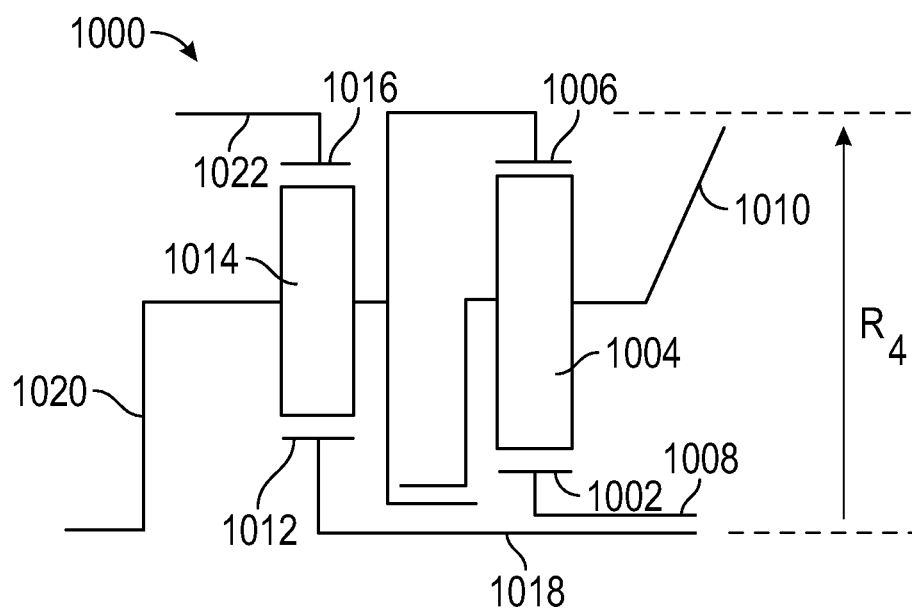
FIG. 10 depicts a cross-sectional schematic illustration of an exemplary embodiment of a gearbox configuration for a turbomachinery engine.
Figure 11:
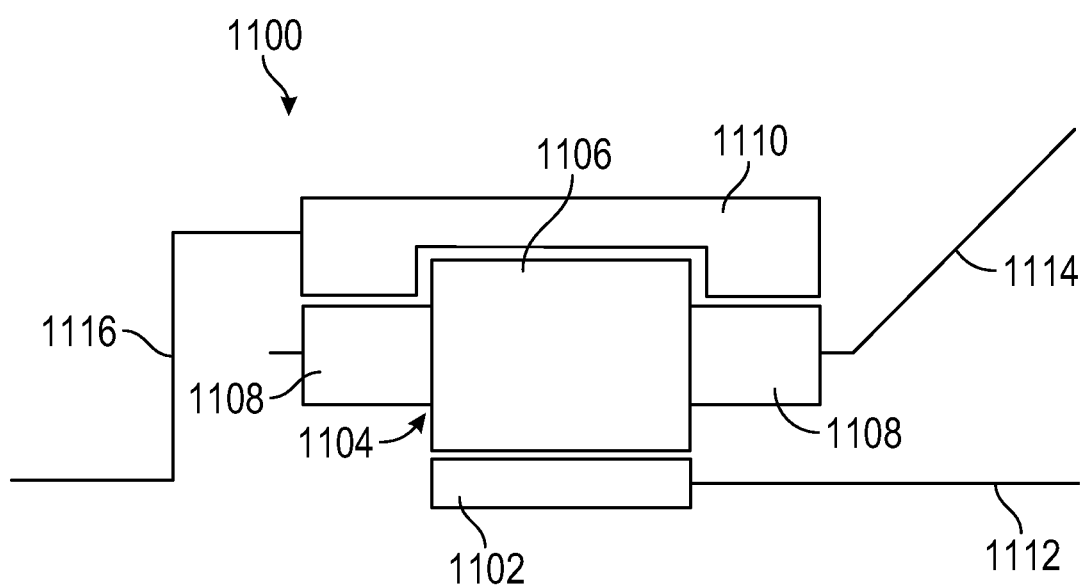
FIG. 11 depicts a cross-sectional schematic illustration of an exemplary embodiment of a gearbox configuration for a turbomachinery engine.

In some embodiments, the gearbox is a single-stage gearbox (e.g., FIGS. 10-11). In other embodiments, the gearbox is a multi-stage gearbox (e.g., FIGS. 9 and 12). In some embodiments, the gearbox is an epicyclic gearbox. In some embodiments, the gearbox is a non-epicyclic gearbox (e.g., a compound gearbox—FIG. 13).

As noted above, the gear assembly can be used to reduce the rotational speed of the output relative to the input. In some embodiments, a gear ratio of the input rotational speed to the output rotational speed is greater than 4.1. For example, in particular embodiments, the gear ratio is within a range of 4.1-14.0, within a range of 4.5-14.0, or within a range of 6.0-14.0. In certain embodiments, the gear ratio is within a range of 4.5-12 or within a range of 6.0-11.0. As such, in some embodiments, the fan assembly can be configured to rotate at a rotational speed of 700-1500 rpm at a cruise flight condition, while the power turbine (e.g., the low-pressure turbine) is configured to rotate at a rotational speed of 2,500-15,000 rpm at a cruise flight condition. In particular embodiments, the fan assembly can be configured to rotate at a rotational speed of 850-1350 rpm at a cruise flight condition, while the power turbine is configured to rotate at a rotational speed of 5,000-10,000 rpm at a cruise flight condition.

In some examples, a gear ratio of the input rotational speed to the output rotational speed is less than 6.0. Gear ratios less than six (e.g., 2.0-6.0) may be particularly suited for the ducted engines disclosed herein. For example, in particular embodiments, the gear ratio is within a range of 2.0-4.1, within a range of 2.5-3.75, or within a range of 3.2-4.1. In certain embodiments, the gear ratio is within a range of 3.0-3.5 or within a range of 3.25-3.55.

Various gear assembly configurations are depicted schematically in FIGS. 9-13. These gearboxes can be used any of the engines disclosed herein, including the engine 100. Additional details regarding the gearboxes are provided below.

Figure 2:
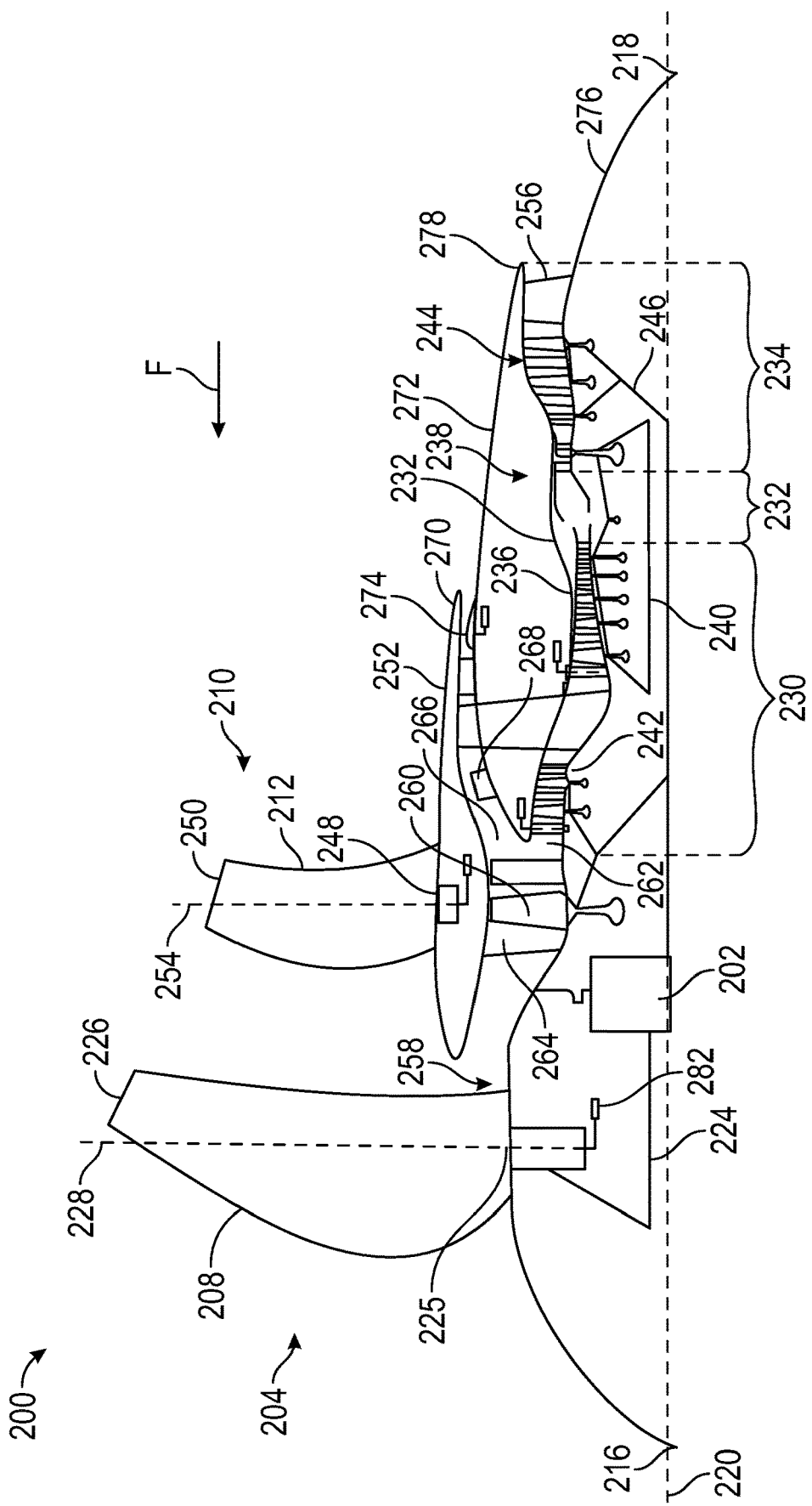
FIG. 2 depicts a cross-sectional schematic illustration of an exemplary embodiment of a turbomachinery engine comprising an open rotor propulsion system, a variable pitch fan, a three-stream architecture, and one or more heat exchangers in a third stream of the three-stream architecture.

FIG. 2 shows a cross-sectional view of an engine 200, which is configured as an exemplary embodiment of an open rotor propulsion engine. The engine 200 is generally similar to the engine 100 and corresponding components have been numbered similarly. For example, the gear assembly of the engine 100 is numbered "102" and the gear assembly of the engine 200 is numbered "202," and so forth. In addition to the gear assembly 202, the engine 200 comprises a fan assembly 204 that includes a plurality of fan blades 208 distributed around the engine centerline axis 220. Fan blades 208 are circumferentially arranged in an equally spaced relation around the engine centerline axis 220, and each fan blade 208 has a root 225 and a tip 226, and an axial span defined therebetween, as well as a central blade axis 228.

The core engine 206 includes a compressor section 230, a combustion section 232, and a turbine section 234 (which may be referred to as "an expansion section") together in a serial flow arrangement. The core engine 206 extends circumferentially relative to an engine centerline axis 220. The core engine 206 includes a high-pressure spool that includes a high-pressure compressor 236 and a high-pressure turbine 238 operably rotatably coupled together by a high-pressure shaft 240. The combustion section 232 is positioned between the high-pressure compressor 236 and the high-pressure turbine 238.

The combustion section 232 may be configured as a deflagrative combustion section, a rotating detonation combustion section, a pulse detonation combustion section, and/or other appropriate heat addition system. The combustion section 232 may be configured as one or more of a rich-burn system or a lean-burn system, or combinations thereof. In still various embodiments, the combustion section 232 includes an annular combustor, a can combustor, a cannular combustor, a trapped vortex combustor (TVC), or other appropriate combustion system, or combinations thereof.

The core engine 206 also includes a booster or low-pressure compressor positioned in flow relationship with the high-pressure compressor 236. The low-pressure compressor 242 is rotatably coupled with the low-pressure turbine 244 via a low-pressure shaft 246 to enable the low-pressure turbine 244 to drive the low-pressure compressor 242. The low-pressure shaft 246 is also operably connected to the gear assembly 202 to provide power to the fan assembly 204, such as described further herein.

It should be appreciated that the terms "low" and "high," or their respective comparative degrees (e.g., "lower" and "higher", where applicable), when used with compressor, turbine, shaft, or spool components, each refer to relative pressures and/or relative speeds within an engine unless otherwise specified. For example, a "low spool" or "low-speed shaft" defines a component configured to operate at a rotational speed, such as a maximum allowable rotational speed, lower than a "high spool" or "high-speed shaft" of the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

The compressors and/or turbines disclosed herein can include various stage counts. As disclosed herein the stage count includes the number of rotors or blade stages in a particular component (e.g., a compressor or turbine). For example, in some embodiments, a low-pressure compressor can comprise 1-8 stages or more narrowly 3 or 4 stages, a high-pressure compressor can comprise 8-15 stages or more narrowly 8-11 stages, or 8-10 stages, or 8 or 9 stages, a high-pressure turbine comprises 1-2 stages, and/or a low-pressure turbine comprises 3-7 stages, or more narrowly 3-5 stages. For example, in certain embodiments, an engine can comprise a one, two, or three stage low-pressure compressor, a 9 or 10 stage high-pressure compressor, a one or two stage high-pressure turbine, and a 4 stage low-pressure turbine. As another example, an engine can comprise a three or four stage low-pressure compressor, a 10 stage high-pressure compressor, a two stage high-pressure turbine, and a 4 stage low-pressure turbine.

In some embodiments, a low-pressure turbine is a counter-rotating low-pressure turbine comprising inner blade stages and outer blade stages. The inner blade stages extend radially outwardly from an inner shaft, and the outer blade stages extend radially inwardly from an outer drum. In particular embodiments, the counter-rotating low-pressure turbine comprises three inner blade stages and three outer blade stages, which can collectively be referred to as a six stage low-pressure turbine. In other embodiments, the counter-rotating low-pressure turbine comprises four inner blade stages and three outer blade stages, which can collectively be referred to as a seven stage low-pressure turbine.

As discussed in more detail below, the core engine 206 includes the gear assembly 202 that is configured to transfer power from the turbine section 234 and reduce an output rotational speed at the fan assembly 204 relative to the low-pressure turbine 244. Embodiments of the gear assembly 202 depicted and described herein can allow for gear ratios suitable for large-diameter unducted fans (e.g., gear ratios of 4.1-4.5, 4.1-14.0, 4.5-14.0, and/or 6.0-14.0). Additionally, embodiments of the gear assembly 202 provided herein may be suitable within the radial or diametrical constraints of the core engine 206 within the outer casing 214.

Various gearbox configurations are depicted schematically in FIGS. 9-13. These gearboxes can be used in any of the engines disclosed herein, including the engine 200. Additional details regarding the gearboxes are provided below.

Engine 200 also includes a vane assembly 210 comprising a plurality of vanes 212 disposed around engine centerline axis 220. Each vane 212 has a root 248 and a tip 250, and a span defined therebetween. Vanes 212 can be arranged in a variety of manners. In some embodiments, for example, they are not all equidistant from the rotating assembly.

In some embodiments, vanes 212 are mounted to a stationary frame and do not rotate relative to the engine centerline axis 220 but may include a mechanism for adjusting their orientation relative to their axis 254 and/or relative to the fan blades 208. For reference purposes, FIG. 2 depicts a forward direction denoted with arrow F, which in turn defines the forward and aft portions of the system.

As depicted in FIG. 2, the fan assembly 204 is located forward of the core engine 106 with the exhaust 256 located aft of core engine 206 in a "puller" configuration. Other configurations are possible and contemplated as within the scope of the present disclosure, such as what may be termed a "pusher" configuration embodiment where the engine core is located forward of the fan assembly. The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

Left- or right-handed engine configurations, useful for certain installations in reducing the impact of multi-engine torque upon an aircraft, can be achieved by mirroring the airfoils (e.g., 208, 212) such that the fan assembly 204 rotates clockwise for one propulsion system and counter-clockwise for the other propulsion system. Alternatively, an optional reversing gearbox can be provided to permits a common gas turbine core and low-pressure turbine to be used to rotate the fan blades either clockwise or counter-clockwise, i.e., to provide either left- or right-handed configurations, as desired, such as to provide a pair of oppositely-rotating engine assemblies can be provided for certain aircraft installations while eliminating the need to have internal engine parts designed for opposite rotation directions.

The engine 200 also includes the gear assembly 202 which includes a gear set for decreasing the rotational speed of the fan assembly 204 relative to the low-pressure turbine 244. In operation, the rotating fan blades 208 are driven by the low-pressure turbine 244 via gear assembly 202 such that the fan blades 208 rotate around the engine centerline axis 220 and generate thrust to propel the engine 200, and hence an aircraft on which it is mounted, in the forward direction F.

In some embodiments, a gear ratio of the input rotational speed to the output rotational speed is greater than 4.1, such as between 4.1 and 4.5 for a ducted turbofan with variable pitch and between 6.0 and 10.0 for an open rotor turbofan. For example, in particular embodiments, the gear ratio is within a range of 4.1-14.0, within a range of 4.5-14.0, or within a range of 6.0-14.0. In certain embodiments, the gear ratio is within a range of 4.5-12 or within a range of 6.0-11.0. As such, in some embodiments, the fan assembly can be configured to rotate at a rotational speed of 700-1500 rpm at a cruise flight condition, while the power turbine (e.g., the low-pressure turbine) is configured to rotate at a rotational speed of 5,000-10,000 rpm at a cruise flight condition. In particular embodiments, the fan assembly can be configured to rotate at a rotational speed of 850-1350 rpm at a cruise flight condition, while the power turbine is configured to rotate at a rotational speed of 5,500-9,500 rpm a cruise flight condition.

It may be desirable that either or both of the fan blades 208 or the vanes 212 to incorporate a pitch change mechanism such that the blades can be rotated with respect to an axis of pitch rotation (annotated as 228 and 254, respectively) either independently or in conjunction with one another. Such pitch change can be utilized to vary thrust and/or swirl effects under various operating conditions, including to provide a thrust reversing feature which may be useful in certain operating conditions such as upon landing an aircraft.

Vanes 212 can be sized, shaped, and configured to impart a counteracting swirl to the fluid so that in a downstream direction aft of both fan blades 208 and vanes 212 the fluid has a greatly reduced degree of swirl, which translates to an increased level of induced efficiency. Vanes 212 may have a shorter span than fan blades 208, as shown in FIG. 2. For example, vanes 212 may have a span that is at least 50% of a span of fan blades 208. In some embodiments, the span of the vanes can be the same or longer than the span as fan blades 208, if desired. Vanes 212 may be attached to an aircraft structure associated with the engine 200, as shown in FIG. 2, or another aircraft structure such as a wing, pylon, or fuselage. Vanes 212 may be fewer or greater in number than, or the same in number as, the number of fan blades 208. In some embodiments, the number of vanes 212 are greater than two, or greater than four, in number. Fan blades 208 may be sized, shaped, and contoured with the desired blade loading in mind.

In the embodiment shown in FIG. 2, an annular 360-degree inlet 258 is located between the fan assembly 204 and the vane assembly 210 and provides a path for incoming atmospheric air to enter the core engine 206 radially inwardly of at least a portion of the vane assembly 210. Such a location may be advantageous for a variety of reasons, including management of icing performance as well as protecting the inlet 258 from various objects and materials as may be encountered in operation.

In the exemplary embodiment of FIG. 2, in addition to the open rotor or unducted fan assembly 204 with its plurality of fan blades 208, an optional ducted fan assembly 260 is included behind fan assembly 204, such that the engine 200 includes both a ducted and an unducted fan which both serve to generate thrust through the movement of air at atmospheric temperature without passage through the core engine 206. The ducted fan assembly 260 is shown at about the same axial location as the vane 212, and radially inward of the root 248 of the vane 212. Alternatively, the ducted fan assembly 260 may be between the vane 212 and core duct 262 or be farther forward of the vane 212. The ducted fan assembly 260 may be driven by the low-pressure turbine 244, or by any other suitable source of rotation, and may serve as the first stage of the low-pressure compressor 242 or may be operated separately. Air entering the inlet 258 flows through an inlet duct 264 and then is divided such that a portion flows through a core duct 262 and a portion flows through a fan duct 266. Fan duct 266 may incorporate one or more heat exchangers 268 and exhausts to the atmosphere through an independent fixed or variable nozzle 270 aft of the vane assembly 210, at the aft end of the fan cowl 252 and outside of the engine core cowl 272. Air flowing through the fan duct 266 thus "bypasses" the core of the engine and does not pass through the core.

Thus, in the exemplary embodiment, engine 200 includes an unducted fan formed by the fan blades 208, followed by the ducted fan assembly 260, which directs airflow into two concentric or non-concentric ducts 262 and 266, thereby forming a three-stream engine architecture with three paths for air which passes through the fan assembly 204. The "first stream" of the engine 200 comprises airflow that passes through the vane assembly 210 and/or outside the fan cowl 252. As such, the first stream can be referred to as "the bypass stream" since the airflow of the first stream does not pass through the core duct 262. The first stream produces the majority of the thrust of the engine 200 and can thus also be referred to as "the primary propulsion stream." The "second stream" of the engine 200 comprises the airflow that flows into the inlet 258, through the inlet duct 264, through the core duct 262, and exits the core nozzle 278. In this manner, the second stream can be referred to as "the core stream." The "third stream" of the engine 200 comprises the airflow that flows into the inlet 258, through the inlet duct 264, through the fan duct 266, and exits the nozzle 270.

A "third stream" as used herein means a secondary air stream capable of increasing fluid energy to produce a minority of total thrust of an engine (e.g., the engine 200). Accordingly, in various embodiments the fan duct 266, having the one or heat exchangers 268 located within the flowpath of the fan duct 266, may be referred to as the "third-stream" of the three-stream engine architecture.

The pressure ratio of the third stream is higher than that of the primary propulsion stream (i.e., the bypass stream). This thrust is produced through a dedicated nozzle or through mixing of the secondary stream with a fan stream or a core stream (e.g., into a common nozzle). In certain exemplary embodiments the operating temperature of an airflow through the third stream is less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures facilitate the heat transfer to or from the fluid in the third stream and a secondary fluid stream. Further, in certain exemplary embodiments, the airflow through the third stream may contribute less than 50% of the total engine thrust (and at least, e.g., 2% of the total engine thrust), and at a takeoff condition, or more particularly while operating at a rated takeoff power at sea level, static flight speed, 86 degrees Fahrenheit ambient temperature operating conditions. Furthermore, in certain exemplary embodiments the airstream, mixing, or exhaust properties (and thereby the aforementioned exemplary percent contribution to total thrust) of the third stream may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

In the exemplary embodiment shown in FIG. 2, a slidable, moveable, and/or translatable plug nozzle 274 with an actuator may be included in order to vary the exit area of the nozzle 270. A plug nozzle is typically an annular, symmetrical device which regulates the open area of an exit such as a fan stream or core stream by axial movement of the nozzle such that the gap between the nozzle surface and a stationary structure, such as adjacent walls of a duct, varies in a scheduled fashion thereby reducing or increasing a space for airflow through the duct. Other suitable nozzle designs may be employed as well, including those incorporating thrust reversing functionality. Such an adjustable, moveable nozzle may be designed to operate in concert with other systems such as VBV's, VSV's, or blade pitch mechanisms and may be designed with failure modes such as fully-open, fully-closed, or intermediate positions, so that the nozzle 270 has a consistent "home" position to which it returns in the event of any system failure, which may prevent commands from reaching the nozzle 270 and/or its actuator. In other embodiments a static nozzle may be utilized.

In some embodiments, a mixing device 276 can be included in a region aft of a core nozzle 278 to aid in mixing the fan stream and the core stream to improve acoustic performance by directing core stream outward and fan stream inward.

Since the engine 200 shown in FIG. 2 includes both an open rotor fan assembly 204, a ducted fan assembly 260 and the third stream, the engine's thrust output and work split can be tailored to achieve specific thrust, fuel burn, thermal management, and/or acoustic signature objectives which may be superior to those of a typical ducted or unducted fan gas turbine propulsion assembly of comparable thrust class. Operationally, the engine 200 may include a control system that manages the loading of the respective open and ducted fans, as well as potentially the exit area of the variable fan nozzle, to provide different thrust, noise, cooling capacity and other performance characteristics for various portions of the flight envelope and various operational conditions associated with aircraft operation. For example, in climb mode the ducted fan may operate at maximum pressure ratio there-by maximizing the thrust capability of stream, while in cruise mode, the ducted fan may operate a lower pressure ratio, raising overall efficiency through reliance on thrust from the unducted fan. Nozzle actuation modulates the ducted fan operating line and overall engine fan pressure ratio independent of total engine airflow. In other embodiments, loading may be managed using a static nozzle.

As noted above, the third stream (e.g., the fan duct 266) may include one or more heat exchangers 268 for removing heat from various fluids used in engine operation (such as an air-cooled oil cooler (ACOC), cooled cooling air (CCA), etc.). Heat exchangers 268 located in the third stream take advantage of the integration into the fan duct 266 with reduced performance penalties (such as fuel efficiency and thrust) compared with traditional ducted fan architectures, due to not impacting the primary source of thrust which is, in this case, the unducted fan stream. Heat exchangers may cool fluids such as gearbox oil, engine sump oil, thermal transport fluids such as supercritical fluids or commercially available single-phase or two-phase fluids (supercritical $CO_2$, EGV, Slither 800, liquid metals, etc.), engine bleed air, etc. Heat exchangers may also be made up of different segments or passages that cool different working fluids, such as an ACOC paired with a fuel cooler. Heat exchangers 268 may be incorporated into a thermal management system which provides for thermal transport via a heat exchange fluid flowing through a network to remove heat from a source and transport it to a heat exchanger.

The third stream can provide advantages in terms of reduced nacelle drag, enabling a more aggressive nacelle close-out, improved core stream particle separation, and inclement weather operation. By exhausting the fan duct flow over the core cowl, this aids in energizing the boundary layer and enabling the option of a steeper nacelle close out angle between the maximum dimension of the engine core cowl 272 and the exhaust 256. The close-out angle is normally limited by air flow separation, but boundary layer energization by air from the fan duct 266 exhausting over the core cowl reduces air flow separation. This yields a shorter, lighter structure with less frictional surface drag.

The fan assembly and/or vane assembly can be shrouded or unshrouded (as shown in FIGS. 1 and 2). Although not shown, an optional annular shroud or duct can be coupled to the vane assembly 210 and located distally from the engine centerline axis 220 relative to the vanes 212. In addition to the noise reduction benefit, the duct may provide improved vibratory response and structural integrity of the vanes 212 by coupling them into an assembly forming an annular ring or one or more circumferential sectors, i.e., segments forming portions of an annular ring linking two or more of the vanes 212. The duct may also allow the pitch of the vanes to be varied more easily. For example, FIGS. 3-4, discussed in more detail below, disclose embodiments in which both the fan assembly and vane assembly are shrouded.

Although depicted above as an unshrouded or open rotor engine in the embodiments depicted above, it should be appreciated that aspects of the disclosure provided herein may be applied to shrouded or ducted engines, partially ducted engines, aft-fan engines, or other turbomachinery configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

The unducted engines 100, 200 can comprise pitch change mechanism configured for adjusting the pitch for fan. In this manner the fans of the engines 100, 200 are VPFs. For example, the engine 200 comprises a pitch change mechanism 282 coupled to the fan assembly 204 and configured to vary the pitch of the fan blades 208. In certain embodiments, the pitch change mechanism 282 can be a linear actuated pitch change mechanism.

Figure 3:
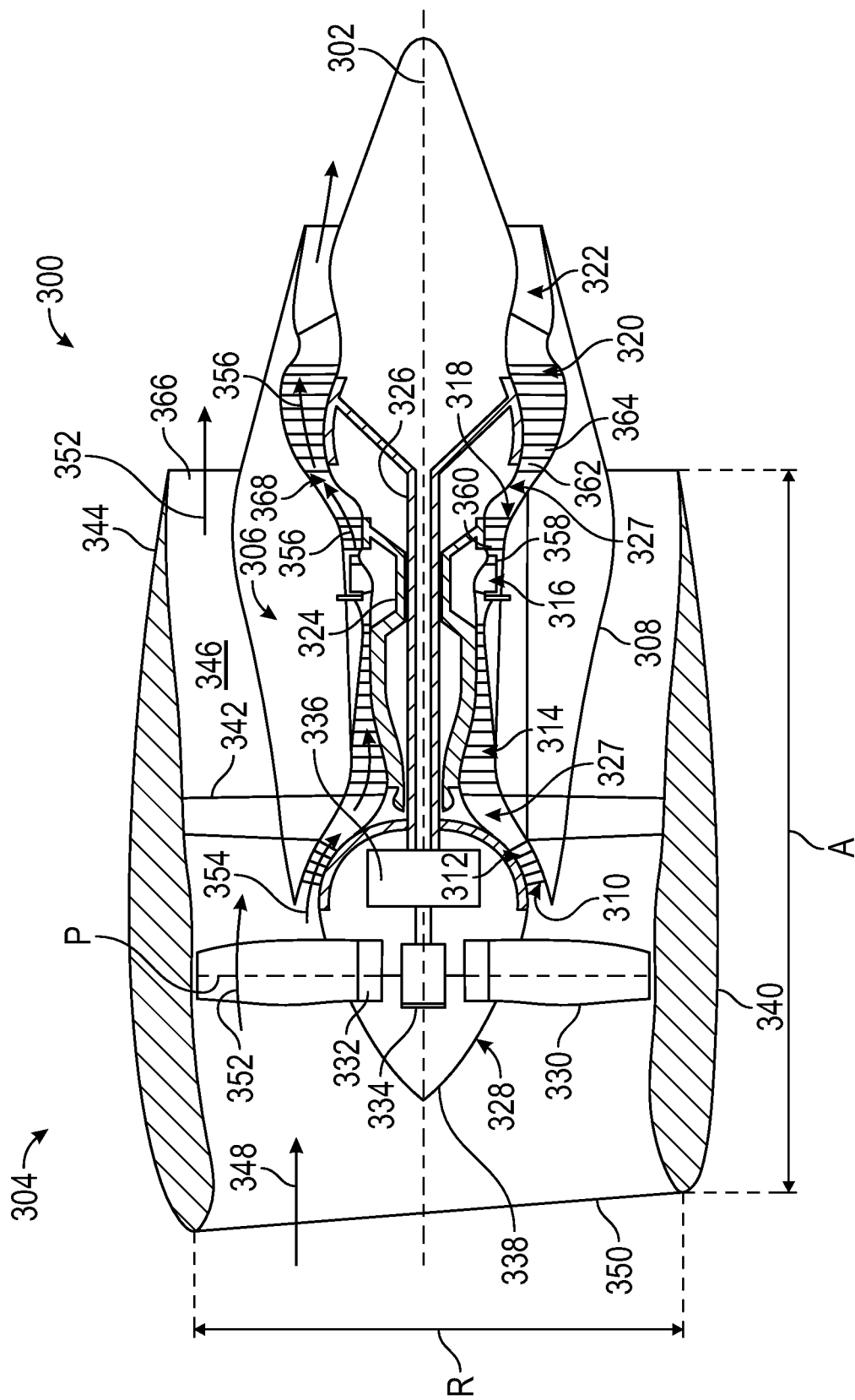
FIG. 3 depicts a cross-sectional schematic illustration of an exemplary embodiment of a turbomachinery engine configured with a ducted propulsion system and a variable pitch fan.

FIG. 3 is a schematic cross-sectional view of a gas turbine engine in accordance with an exemplary embodiment of the present disclosure. More particularly, for the embodiment of FIG. 3, the gas turbine engine is a high-bypass turbofan jet engine 300, referred to herein as "turbofan engine 300." As shown in FIG. 3, the turbofan engine 300 defines an axial direction A (extending parallel to a longitudinal centerline 302 provided for reference) and a radial direction R (extending perpendicular to the axial direction A). In general, the engine 300 includes a fan section 304 and a core engine 306 disposed downstream from the fan section 304. The engine 300 also includes a gear assembly or power gear box 336 having a plurality of gears for coupling a gas turbine shaft to a fan shaft. The position of the power gear box 336 is not limited to that as shown in the exemplary embodiment of the engine 300. For example, the position of the power gear box 336 may vary along the axial direction A.

The exemplary core engine 306 depicted generally includes a substantially tubular outer casing 308 that defines an annular inlet 310. The outer casing 308 encases, in serial flow relationship, a compressor section including a booster or low-pressure (LP) compressor 312 and a high-pressure (HP) compressor 314; a combustion section 316; a turbine section including a high-pressure (HP) turbine 318 and a low-pressure (LP) turbine 320; and a jet exhaust nozzle section 322. A high-pressure (HP) shaft or spool 324 drivingly connects the HP turbine 318 to the HP compressor 314. A low-pressure (LP) shaft or spool 326 drivingly connects the LP turbine 320 to the LP compressor 312. Additionally, the compressor section, combustion section 316, and turbine section together define at least in part a core air flowpath 327 extending therethrough.

A gear assembly of the present disclosure is compatible with standard fans, variable pitch fans, or other configurations. For the embodiment depicted, the fan section 304 includes a variable pitch fan 328 having a plurality of fan blades 330 coupled to a disk 332 in a spaced apart manner. As depicted, the fan blades 330 extend outwardly from disk 332 generally along the radial direction R. Each fan blade 330 is rotatable relative to the disk 332 about a pitch axis P by virtue of the fan blades 330 being operatively coupled to a suitable actuation member 334 configured to collectively vary the pitch of the fan blades 330. The fan blades 330, disk 332, and actuation member 334 are together rotatable about the longitudinal axis 302 by LP shaft 326 across a gear assembly or power gear box 336. A gear assembly 336 may enable a speed change between a first shaft, e.g., LP shaft 326, and a second shaft, e.g., LP compressor shaft and/or fan shaft. For example, in one embodiment, the gear assembly 336 may be disposed in an arrangement between a first shaft and a second shaft such as to reduce an output speed from one shaft to another shaft.

More generally, the gear assembly 336 can be placed anywhere along the axial direction A to decouple the speed of two shafts, whenever it is convenient to do so from a component efficiency point of view, e.g., faster LP turbine and slower fan and LP compressor or faster LP turbine and LP compressor and slower fan.

Referring still to the exemplary embodiment of FIG. 3, the disk 332 is covered by rotatable front nacelle 338 aerodynamically contoured to promote an airflow through the plurality of fan blades 330. Additionally, the exemplary fan section 304 includes an annular fan casing or outer nacelle 340 that circumferentially surrounds the fan 328 and/or at least a portion of the core engine 306. The nacelle 340 is, for the embodiment depicted, supported relative to the core engine 306 by a plurality of circumferentially-spaced outlet guide vanes 342. Additionally, a downstream section 344 of the nacelle 340 extends over an outer portion of the core engine 306 so as to define a bypass airflow passage 346 therebetween.

During operation of the turbofan engine 300, a volume of air 348 enters the engine 300 through an associated inlet 350 of the nacelle 340 and/or fan section 304. As the volume of air 348 passes across the fan blades 330, a first portion of the air 348 as indicated by arrows 352 is directed or routed into the bypass airflow passage 346 and a second portion of the air 348 as indicated by arrow 354 is directed or routed into the LP compressor 312. The ratio between the first portion of air 352 and the second portion of air 354 is commonly known as a bypass ratio. The pressure of the second portion of air 354 is then increased as it is routed through the high-pressure (HP) compressor 314 and into the combustion section 316, where it is mixed with fuel and burned to provide combustion gases 356.

The combustion gases 356 are routed through the HP turbine 318 where a portion of thermal and/or kinetic energy from the combustion gases 356 is extracted via sequential stages of HP turbine stator vanes 358 that are coupled to the outer casing 308 and HP turbine rotor blades 360 that are coupled to the HP shaft or spool 324, thus causing the HP shaft or spool 324 to rotate, thereby supporting operation of the HP compressor 314. The combustion gases 356 are then routed through the LP turbine 320 where a second portion of thermal and kinetic energy is extracted from the combustion gases 356 via sequential stages of LP turbine stator vanes 362 that are coupled to the outer casing 308 and LP turbine rotor blades 364 that are coupled to the LP shaft or spool 326, thus causing the LP shaft or spool 326 to rotate, thereby supporting operation of the LP compressor 312 and/or rotation of the fan 328.

The combustion gases 356 are subsequently routed through the jet exhaust nozzle section 322 of the core engine 306 to provide propulsive thrust. Simultaneously, the pressure of the first portion of air 352 is substantially increased as the first portion of air 352 is routed through the bypass airflow passage 346 before it is exhausted from a fan nozzle exhaust section 366 of the engine 300, also providing propulsive thrust. The HP turbine 318, the LP turbine 320, and the jet exhaust nozzle section 322 at least partially define a hot gas path 368 for routing the combustion gases 356 through the core engine 306.

Figure 4:
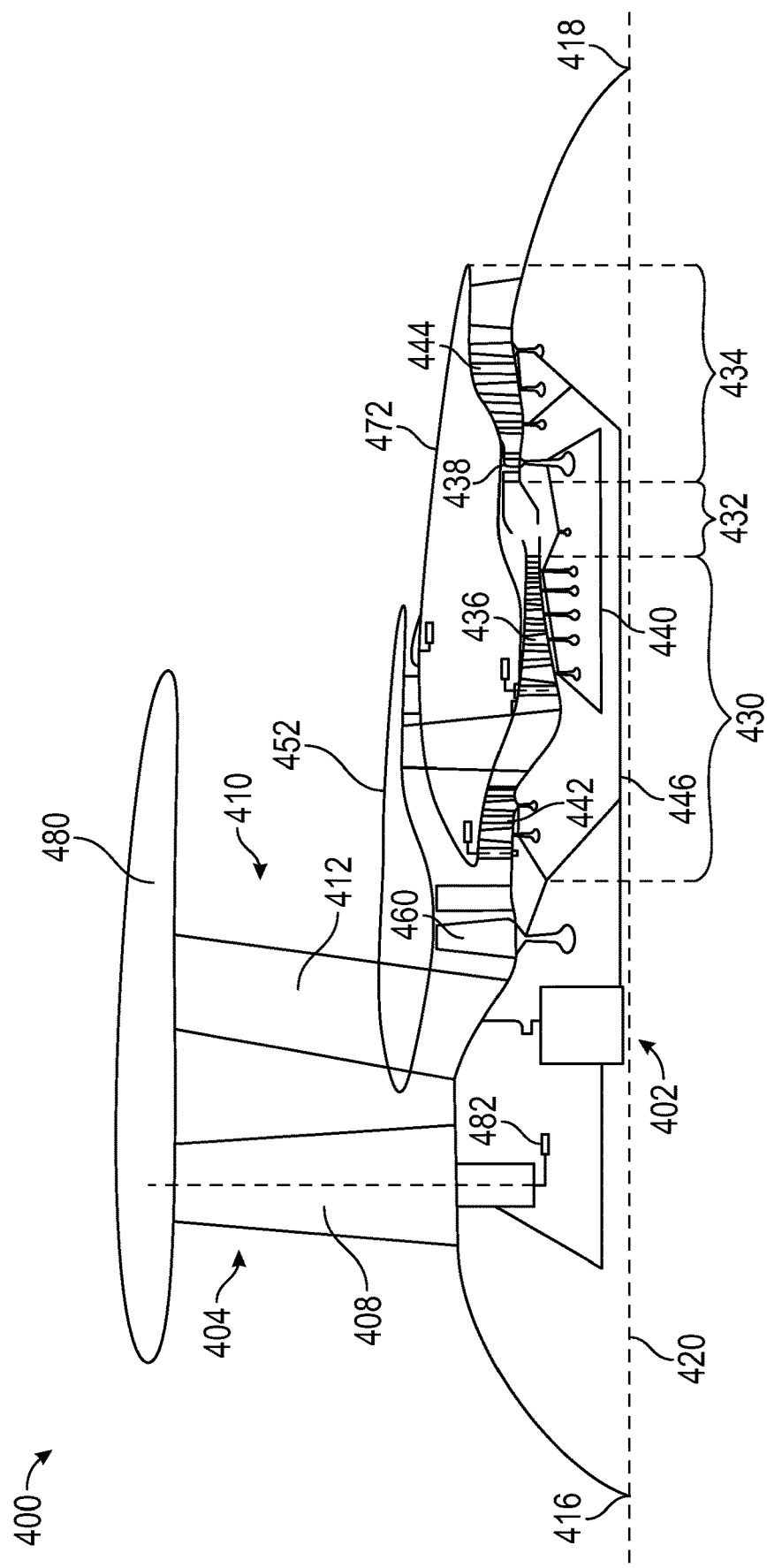
FIG. 4 depicts a cross-sectional schematic illustration of an exemplary embodiment of a turbomachinery engine comprising a ducted propulsion system, a variable pitch fan, a three-stream architecture, and one or more heat exchangers in a third stream of the three-stream architecture.

For example, FIG. 4 is a cross-sectional schematic illustration of an exemplary embodiment of an engine 400 that includes a gear assembly 402 in combination with a ducted fan assembly 404 and a core engine 406. However, unlike the open rotor configuration of the engine 200, the fan assembly 404 and its fan blades 408 are contained within an annular fan case 480 (which can also be referred to as "a nacelle") and the vane assembly 410 and the vanes 412 extend radially between the fan cowl 452 (and/or the engine core cowl 472) and the inner surface of the fan case 480, thereby defining the bypass stream. As discussed above, the gear assemblies disclosed herein can provide for increased gear ratios for a fixed gear envelope (e.g., with the same size ring gear), or alternatively, a smaller diameter ring gear may be used to achieve the same gear ratios.

The core engine 406 comprises a compressor section 430, a combustor section 432, and a turbine section 434. The compressor section 430 can include a high-pressure compressor 436 and a booster or a low-pressure compressor 442. The turbine section 434 can include a high-pressure turbine 438 and a low-pressure turbine 444. The low-pressure compressor 442 is positioned forward of and in flow relationship with the high-pressure compressor 436. The low-pressure compressor 442 is rotatably coupled with the low-pressure turbine 444 via a low-pressure shaft 446 to enable the low-pressure turbine 444 to drive the low-pressure compressor 442 (and a ducted fan 460). The low-pressure shaft 446 is also operably connected to the gear assembly 402 to provide power to the fan assembly 404. The high-pressure compressor 436 is rotatably coupled with the high-pressure turbine 438 via a high-pressure shaft 440 to enable the high-pressure turbine 438 to drive the high-pressure compressor 436.

One portion of the airflow from the ducted fan 460 can be directed into the core engine 406 (i.e., a second stream). Another portion of the airflow from the ducted fan 460 can be directed into a third stream 407 defined by the inner surface of the fan cowl 452 and the outer surface of the engine core cowl 472. In some examples, the third stream can comprise one or more heat exchangers.

The engine 400 (and/or the engine 300) comprises a pitch change mechanism 482 coupled to the fan assembly 404 and configured to vary the pitch of the fan blades 408. In certain embodiments, the pitch change mechanism 482 can be a linear actuated pitch change mechanism.

In some embodiments, the engine 400 can comprise a variable fan nozzle. Operationally, the engine 400 may include a control system that manages the loading of the fan, as well as potentially the exit area of the variable fan nozzle, to provide different thrust, noise, cooling capacity and other performance characteristics for various portions of the flight envelope and various operational conditions associated with aircraft operation. For example, nozzle actuation modulates the fan operating line and overall engine fan pressure ratio independent of total engine airflow. In other examples, the engine can comprise a static nozzle.

Figure 5:
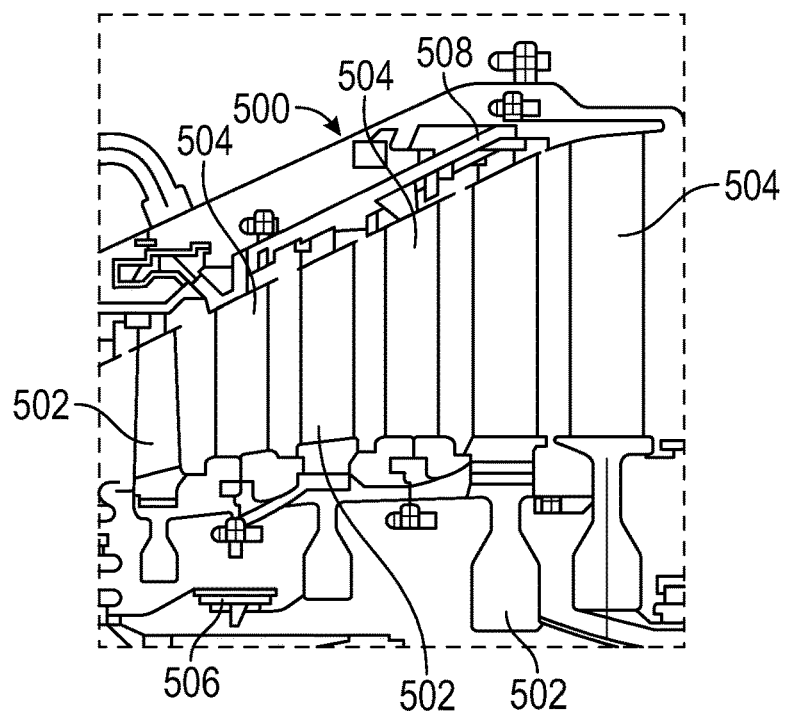
FIG. 5 depicts a cross-sectional schematic illustration of an exemplary embodiment of a counter-rotating low-pressure turbine of a turbomachinery engine, the low-pressure turbine having a 3×3 configuration.
Figure 6:
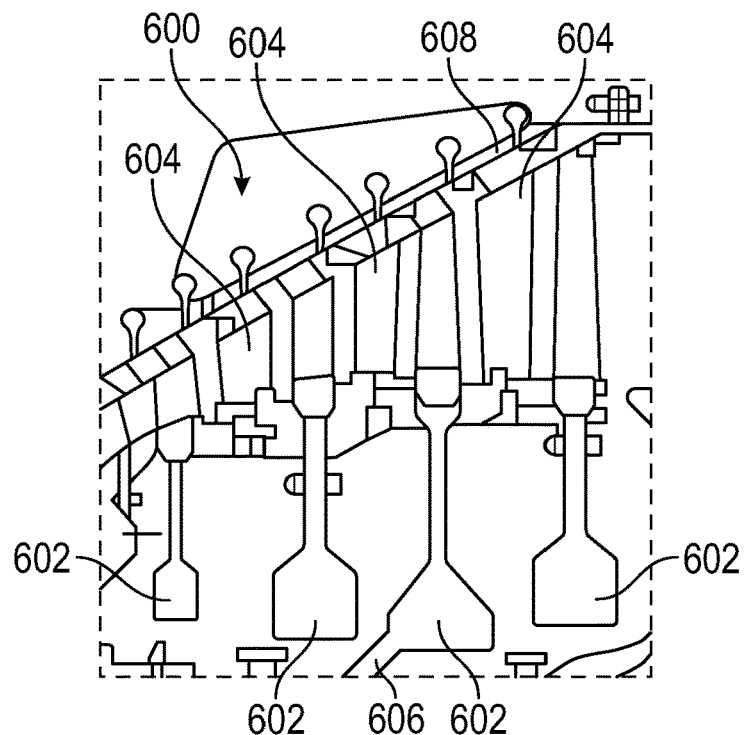
FIG. 6 depicts a cross-sectional schematic illustration of an exemplary embodiment of a counter-rotating low-pressure turbine of a turbomachinery engine, the low-pressure turbine having a 4×3 configuration.

In some embodiments, an engine (e.g., the engine 100, the engine 200, and/or the engine 400) can comprise a counter-rotating low-pressure turbine. For example, FIGS. 5-6 depict schematic cross-sectional illustrations of counter-rotating low-pressure turbines. In particular, FIG. 5 depicts a counter-rotating turbine 500, and FIG. 6 depicts a counter-rotating turbine 600. The counter-rotating turbines comprise inner blade stages and outer blade stages arranged in an alternating inner-outer configuration. In other words, the counter-rotating turbines do not comprise stator vanes disposed between the blade stages.

Referring to FIG. 5, the counter-rotating turbine 500 comprises a plurality of inner blade stages 502 and a plurality of outer blade stages 504. More specifically, the counter-rotating turbine 500 includes three inner blades stages 502 that are coupled to and extend radially outwardly from an inner shaft 506 (which can also be referred to as "a rotor") and three outer blade stages 504 that are coupled to extend radially inwardly from an outer shaft 508 (which can also be referred to as "a drum"). In this manner, the counter-rotating turbine 500 can be considered a six stage turbine.

Referring to FIG. 6, the counter-rotating turbine 600 comprises a plurality of inner blade stages 602 and a plurality of outer blade stages 604. More specifically, the counter-rotating turbine 600 includes four inner blade stages 602 that are coupled to and extend radially outwardly from an inner shaft 606 and three outer blade stages 604 that are coupled to extend radially inwardly from an outer shaft 608. In this manner, the counter-rotating turbine 600 can be considered a seven stage turbine.

According to some embodiments there is a turbomachinery characterized by a high gear ratio. A high gear ratio gearbox means a gearbox with a gear ratio of above about 4:1 to about 14:1 (or about 4.5:1 to about 12:1 in particular embodiments). For example, the engines disclosed herein can include a gearbox configured such the output speed (i.e., the speed of the propulsor) is about 400-1200 rpm at a cruise flight condition, or more particularly 450-1000 rpm at a cruise flight condition.

Various exemplary gear assemblies are shown and described herein. In particular, FIGS. 7-11 schematically depict several exemplary gear assemblies that can be used with the engines 100, 200, 300, 400. The disclosed gear assemblies may be utilized with any of the exemplary engines and/or any other suitable engine for which such gear assemblies may be desirable. In such a manner, it will be appreciated that the gear assemblies disclosed herein may generally be operable with an engine having a rotating element with a plurality of rotor blades and a turbomachinery having a turbine and a shaft rotatable with the turbine. With such an engine, the rotating element (e.g., fan assembly 104) may be driven by the shaft (e.g., low-pressure shaft) of the turbomachinery through the gear assembly.

Although the exemplary gear assemblies shown are mounted at a forward location (e.g., forward from the combustor and/or the low-pressure compressor), in other embodiments, the gear assemblies described herein can be mounted at an aft location (e.g., aft of the combustor and/or the low-pressure turbine).

Various embodiments of the gear assembly provided herein may allow for gear ratios of up to 14:1 (e.g., 2:1 to 14:1). Still various embodiments of the gear assemblies provided herein may allow for gear ratios of at least 4.1:1 or 4.5:1. Still yet various embodiments of the gear assemblies provided herein allow for gear ratios of 6:1 to 12:1.

Figure 7:
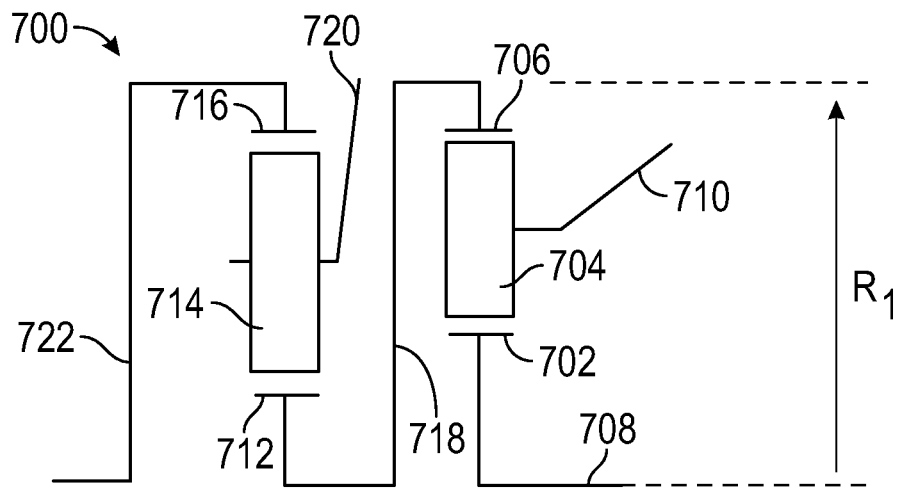
FIG. 7 depicts a cross-sectional schematic illustration of an exemplary embodiment of a gearbox configuration for a turbomachinery engine.

FIG. 7 schematically depicts a gearbox 700 that can be used, for example, with engines 100, 200, 300, 400. The gearbox 700 comprises a two-stage star configuration.

The first stage of the gearbox 700 includes a first-stage sun gear 702, a first-stage carrier 704 housing a plurality of first-stage star gears, and a first-stage ring gear 706. The first-stage sun gear 702 can be coupled to a low-pressure shaft 708, which in turn is coupled to the low-pressure turbine of the engine. The first-stage sun gear 702 can mesh with the first-stage star gears, which mesh with the first-stage ring gear. The first-stage carrier 704 can be fixed from rotation by a support member 710.

The second stage of the gearbox 700 includes a second-stage sun gear 712, a second-stage carrier 714 housing a plurality of second-stage star gears, and a second-stage ring gear 716. The second-stage sun gear 712 can be coupled to a shaft 718 which in turn is coupled to the first-stage ring gear 706. The second-stage carrier 714 can be fixed from rotation by a support member 720. The second-stage ring gear 716 can be coupled to a fan shaft 722.

In some embodiments, each stage of the gearbox 700 can comprise five star gears. In other embodiments, the gearbox 700 can comprise fewer or more than five star gears in each stage. In some embodiments, the first-stage carrier can comprise a different number of star gears than the second-stage carrier. For example, the first-stage carrier can comprise five star gears, and the second-stage carrier can comprise three star gears, or vice versa.

In some embodiments, the radius $R_1$ of the gearbox 700 can be about 16-19 inches. In other embodiments, the radius $R_1$ of the gearbox 700 can be about 22-24 inches. In other embodiments, the radius $R_1$ of the gearbox 700 can be smaller than 16 inches or larger than 24 inches.

Figure 8:
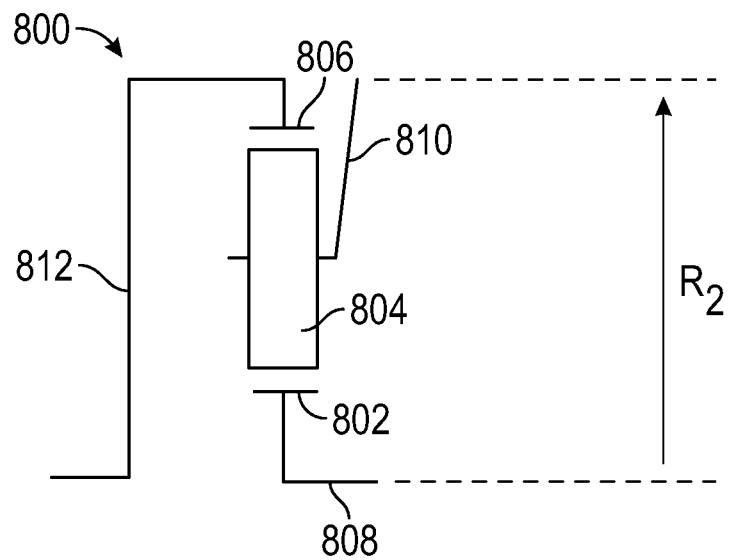
FIG. 8 depicts a cross-sectional schematic illustration of an exemplary embodiment of a gearbox configuration for a turbomachinery engine.

FIG. 8 schematically depicts a gearbox 800 that can be used, for example, with engines 100, 200, 300, 400. The gearbox 800 comprises a single-stage star configuration. The gearbox 800 includes a sun gear 802, a carrier 804 housing a plurality of star gears (e.g., 3-5 star gears), and a ring gear 806. The sun gear 802 can mesh with the star gears, and the star gears can mesh with the ring gear 806. The sun gear 802 can be coupled to a low-pressure shaft 808, which in turn is coupled to the low-pressure turbine of the engine. The carrier 804 can be fixed from rotation by a support member 810. The ring gear 806 can be coupled to a fan shaft 812.

In some embodiments, the radius $R_2$ of the gearbox 800 can be about 18-23 inches. In other embodiments, the radius $R_2$ of the gearbox 700 can be smaller than 18 inches or larger than 23 inches.

FIG. 9 schematically depicts a gearbox 900 that can be used, for example, with engines 100, 200, 300, 400. The gearbox 900 comprises a single-stage star configuration. The gearbox 900 includes a sun gear 902, a carrier 904 housing a plurality of star gears (e.g., 3-5 star gears), and a ring gear 906. The sun gear 902 can mesh with the star gears, and the star gears can mesh with the ring gear 906. The sun gear 902 can be coupled to a low-pressure shaft 908, which in turn is coupled to the low-pressure turbine of the engine. The carrier 904 can be fixed from rotation by a support member 910. The ring gear 906 can be coupled to a fan shaft 912.

In some embodiments, the radius $R_3$ of the gearbox 900 can be about 10-13 inches. In other embodiments, the radius $R_3$ of the gearbox 900 can be smaller than 10 inches or larger than 13 inches.

FIG. 10 schematically depicts a gearbox 1000 that can be used, for example, with engines 100, 200, 300, 400. The gearbox 1000 comprises a two-stage configuration in which the first stage is a star configuration and the second stage is a planet configuration.

The first stage of the gearbox 1000 includes a first-stage sun gear 1002, a first-stage star carrier 1004 comprising a plurality of first-stage star gears (e.g., 3-5 star gears), and a first-stage ring gear 1006. The first-stage sun gear 1002 can mesh with the first-stage star gears, and the first-stage star gears can mesh with the first-stage ring gear 1006. The first-stage sun gear 1002 can be coupled to a higher-speed shaft 1008 of the low spool, which in turn is coupled to the inner blades of the low-pressure turbine of the engine. The first-stage star carrier 1004 can be fixed from rotation by a support member 1010.

The second stage of the gearbox 1000 includes a second-stage sun gear 1012, a second-stage planet carrier 1014 comprising a plurality of second-stage planet gears (e.g., 3-5 planet gears), and a second-stage ring gear 1016. The second-stage sun gear 1012 can mesh with the second-stage planet gears. The second-stage planet carrier 1014 can be coupled to the first-stage ring gear 1006. The second-stage sun gear 1012 can be coupled to a lower-speed shaft 1018 of the low spool, which in turn is coupled to the outer blades of the low-pressure turbine of Engine 4. The second-stage planet carrier 1014 can be coupled to the first-stage ring gear 1006. The second-stage planet carrier 1014 can also be coupled to a fan shaft 1020. The second-stage ring gear 1016 can be fixed from rotation by a support member 1022.

In some embodiments, each stage of the gearbox 1000 can comprise three star/planet gears. In other embodiments, the gearbox 1000 can comprise fewer or more than three star/planet gears in each stage. In some embodiments, the first-stage carrier can comprise a different number of star gears than the second-stage carrier has planet gears. For example, the first-stage carrier can comprise five star gears, and the second-stage carrier can comprise three planet gears, or vice versa.

Since the first stage of the gearbox 1000 is coupled to the higher-speed shaft 1008 of the low spool and the second stage of the gearbox 1000 is coupled to the lower-speed shaft 1018 of the low spool, the gear ratio of the first stage of the gearbox 1000 can be greater than the gear ratio of the second stage of the gearbox. For example, in certain embodiments, the first stage of the gearbox can comprise a gear ratio of 4.1-14, and the second stage of the gearbox can comprise a gear ratio that is less than the gear ratio of the first stage of the gearbox. In particular embodiments, the first stage of the gearbox can comprise a gear ratio of 7, and the second stage of the gearbox can comprise a gear ratio of 6.

In some embodiments, an engine comprising the gearbox 1000 can be configured such that the higher-speed shaft 1008 provides about 50% of the power to the gearbox 1000 and the lower-speed shaft 1018 provides about 50% of the power to the gearbox 1000. In other embodiments, an engine comprising the gearbox 1000 can be configured such that the higher-speed shaft 1008 provides about 60% of the power to the gearbox 1000 and the lower-speed shaft 1018 provides about 40% of the power to the gearbox 1000.

In some embodiments, the radius $R_4$ of the gearbox 1000 can be about 18-22 inches. In other embodiments, the radius $R_4$ of the gearbox 700 can be smaller than 18 inches or larger than 22 inches.

FIG. 11 depicts a gearbox 1100 that can be used, for example, with the engines disclosed herein (e.g., the engines 100, 200, 300, 400). The gearbox 1100 is configured as a compound star gearbox. The gearbox 1100 comprises a sun gear 1102 and a star carrier 1104, which includes a plurality of compound star gears having one or more first portions 1106 and one or more second portions 1108. The gearbox 1100 further comprises a ring gear 1110. The sun gear 1102 can also mesh with the first portions 1106 of the star gears. The star carrier can be fixed from rotation via a support member 1114. The second portions 1108 of the star gears can mesh with the ring gear 1110. The sun gear 1102 can be coupled to a low-pressure turbine via the turbine shaft 1112. The ring gear 1110 can be coupled to a fan shaft 1116.

The gear assemblies shown and described herein can be used with any suitable engine. For example, although FIG. 4 shows an optional ducted fan and optional fan duct (similar to that shown in FIG. 2), it should be understood that such gear assemblies can be used with other ducted turbofan engines (e.g., the engine 300) and/or other open rotor engines that do not have one or more of such structures.

The engines depicted in FIGS. 1-4 are configured such that the fan assembly and the core engine are concentric (i.e., the rotate about a common axis, which may also be referred to as "coaxial"). In other embodiments, an engine can be configured such that the fan assembly rotates about a first axis and the core engine rotates about a second axis that are non-concentric (also referred to as "eccentric").

Each embodiment of a turbomachinery disclosed herein comprises a variable pitch fan ("VPF") and actuation member (e.g., the actuation member 334), which may also be referred to as a pitch change mechanism. The disclosed engines can also comprise a gearbox. Adoption of a variable pitch fan provides one or more advantages (e.g., increased propulsive efficiency) and also presents significant challenges. For example, incorporating variable pitch fan blades creates challenges with the mechanical packaging and mechanical integration including the packaging and integration of the actuation member and coupling between the blades and actuation member. Turbomachinery that instead have a fixed pitch for fan blades are comparatively simpler to implement. For example, when a fixed pitch turbomachinery is adopted, it is much easier to achieve a reduction in fan radius ratio (as defined below) because less space is needed for packaging and integration of a fan blade below the blade root, e.g., less space is needed because attachment of a blade is made directly to the fan disk as opposed to through a bearing assembly. The desire to achieve an acceptable fan radius ratio while providing a variable pitch capability for a fan blade, and arriving at a turbomachinery design incorporating such a capability while satisfying other necessary requirements, such as acceptable reliability for its intended use, mission requirements, etc., safety margin in the event of, e.g., debris impacting and damaging a fan blade, and accessibility for servicing of a variable pitch fan, blade replacement, etc. presents formidable challenges to overcome.

Starting from this basis, the inventors set out to define the various demands on a variable pitch fan and then constructed a variety of embodiments to meet those varying demands. During the process of developing the aforementioned embodiments of turbomachinery engines comprising variable pitch fans, the inventors discovered, unexpectedly, that a few particular fan parameters arranged in a unique combination provided a good approximation for an overall variable pitch fan design. More specifically, the inventors discovered that certain ranges of values defining embodiments of a variable pitch fan including, but not limited to bearing size, shape, orientation, material, etc., can inform the skilled artisan of the positive and negative attributes of choosing one embodiment over another, and as a function of the performance requirements of the turbomachinery. Thus, the inventors realized they had discovered values defining not only benefits but also penalties associated with choosing one design over another depending on the requirements of the engine (e.g., blade size, tip speed of fan, packaging, integration, etc.). The embodiments defined by these VPF parameters, as they are called, therefore provide a significant benefit because they define a design space down to a reduced number of practical embodiments based on the underlying structural requirements needed to meet the demand. Those structural requirements implicated are with respect to demands such as achieving a particular weight, size, drag, and/or other factors relevant to the mechanical packaging of the VPF. For example, the VPF parameter ranges disclosed herein account for limitations (e.g., bearing stress) and thus allow for adequate mechanical integration. One particularly advantageous aspect of the inventor's discovery is that the VPF parameters can be utilized with either unducted or ducted fan designs.

There are two VPF parameters that the inventors discovered to be of particular significance. The first VPF parameter is defined as the hub-to-tip radius ratio of the fan ("RR") divided by the fan pressure ratio ("FPR") measured at a static sea-level takeoff operating condition. The second VPF parameter is defined as the bearing spanwise force of the fan ("F_span") at a redline operating condition measured in pounds force divided by the fan area ("F_area") measured in square inches.

Figure 19:
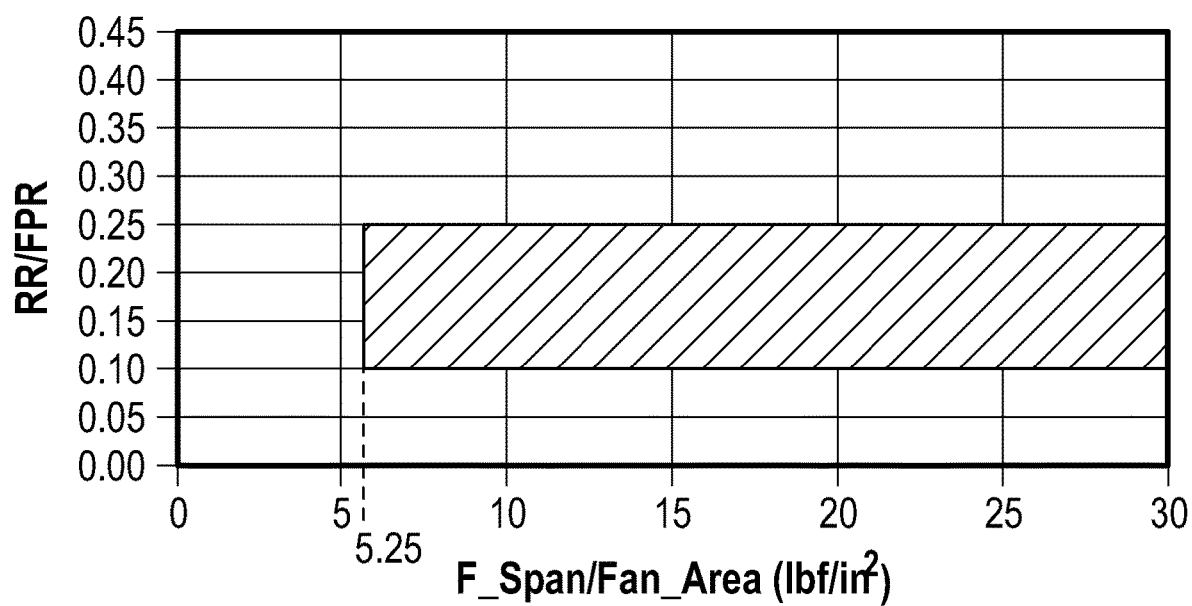
FIG. 19 depicts an exemplary range of a first VPF parameter relative to an exemplary range of a second VPF parameter, which can be particularly advantageous for a turbomachinery comprising a variable pitch fan.

As used herein, fan radius ratio is defined as the fan hub radius (R_hub) divided by the fan tip radius (R_tip), both measured at the leading edge of the fan blades from the fan rotation axis. An exemplary fan comprising the various dimensions is depicted in FIG. 19. In some examples, the fan radius ratio is within a range of 0.125-0.55. In other examples, the fan radius ratio is within a range of 0.2-0.5. In particular examples, the fan radius ratio is within a range of 0.25-0.35.

Fan pressure ratio is defined as the ratio of total pressures across the fan (exit/inlet) during a static sea-level takeoff (SLTO) operating condition. In some examples, the fan pressure ratio at a static sea-level takeoff operating condition is within a range of 1.05-1.5. In other examples, the fan pressure ratio at a static sea-level takeoff operating condition is within a range of 1.05-1.15, which (in certain instances) can correspond to an unducted fan. In particular examples, the fan pressure ratio at a static sea-level takeoff operating condition is within a range of 1.2-1.4, which (in certain instances) can correspond to a ducted fan.

Bearing spanwise force (F_span) of a fan blade is defined as (mass of the fan blade/386.4)*R_cg*$\omega^2$, where R_cg is the radius of the center of gravity of the fan blade measured from the fan rotation axis (inches), and $\omega$ is a redline speed of the fan measured in radians/second. The center of gravity and thus the R_cg can be calculated or approximated in various ways. As one example, R_cg can be approximated by the following equation: R_hub+⅓*(R_tip−R_hub). F_span is measured in pounds force (lbf). In some examples, F_span is within a range of 20,000-200,000 lbf at a redline operating condition. In other examples, F_span is within a range of 50,000-100,000 lbf at a redline operating condition.

The fan blade area (F_area) equals $\pi$*(R_tip$^2$−R_hub$^2$), which results in an area in square inches. In some examples, F_area is within a range of 3,000-25,000 in$^2$. In other examples, F_area is within a range of 5,000-15,000 in$^2$. In particular examples, F_area is within a range of 4,000-8,000 in$^2$.

It should be noted that the terms of "Fan Center of Gravity," "Fan Mass," "F_Span," and "Fan_Area" are for any one fan blade of an engine. Therefore, it should be noted that the values of "Fan Center of Gravity," "Fan Mass," "F_Span," and "Fan_Area" listed herein (e.g., in the table of FIGS. 25-26, other examples, and the claims) apply to any one fan blade of the engine.

Figure 12:
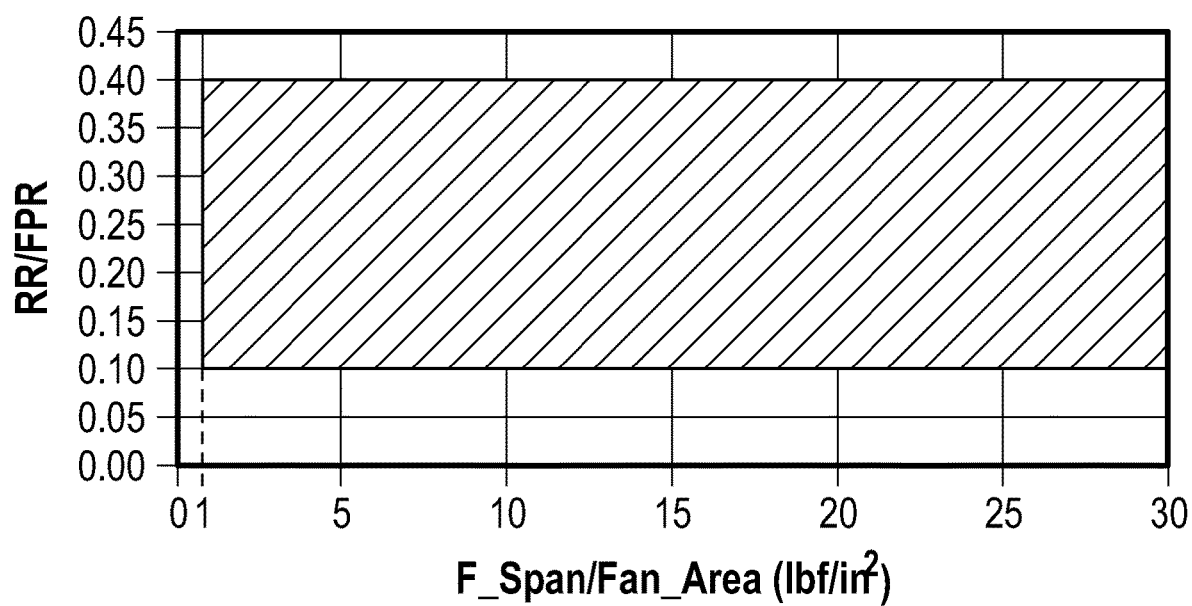
FIG. 12 depicts an exemplary range of a first VPF parameter relative to an exemplary range of a second VPF parameter, which can be particularly advantageous for a turbomachinery comprising a variable pitch fan.

As depicted in FIG. 12, in some examples, a VPF can be configured such that the first VPF parameter (i.e., RR/FPR) is or is about 0.10-0.40 and the second VPF parameter (i.e., F_span/Fan_area) is or is about 1-30 lbf/in$^2$. These ranges apply to both ducted and unducted engines.

Figure 13:
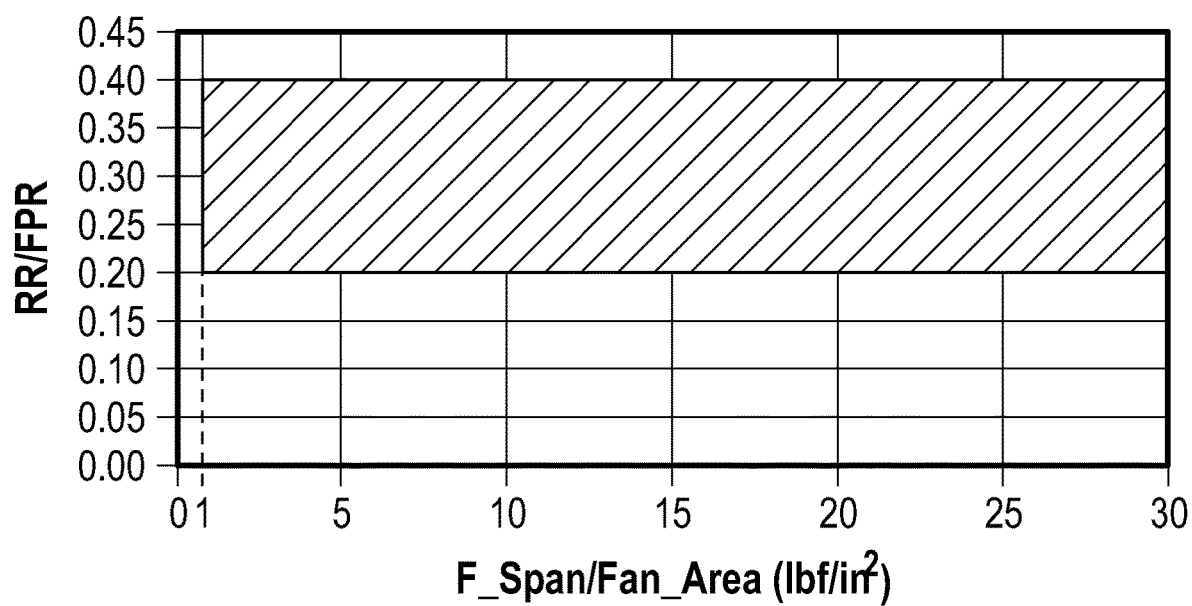
FIG. 13 depicts an exemplary range of a first VPF parameter relative to an exemplary range of a second VPF parameter, which can be particularly advantageous for a turbomachinery comprising a variable pitch fan.

As depicted in FIG. 13, in some examples, a VPF can be configured such that the first VPF parameter is or is about 0.20-0.40 and the second VPF parameter is or is about 1-30 lbf/in$^2$.

Figure 14:
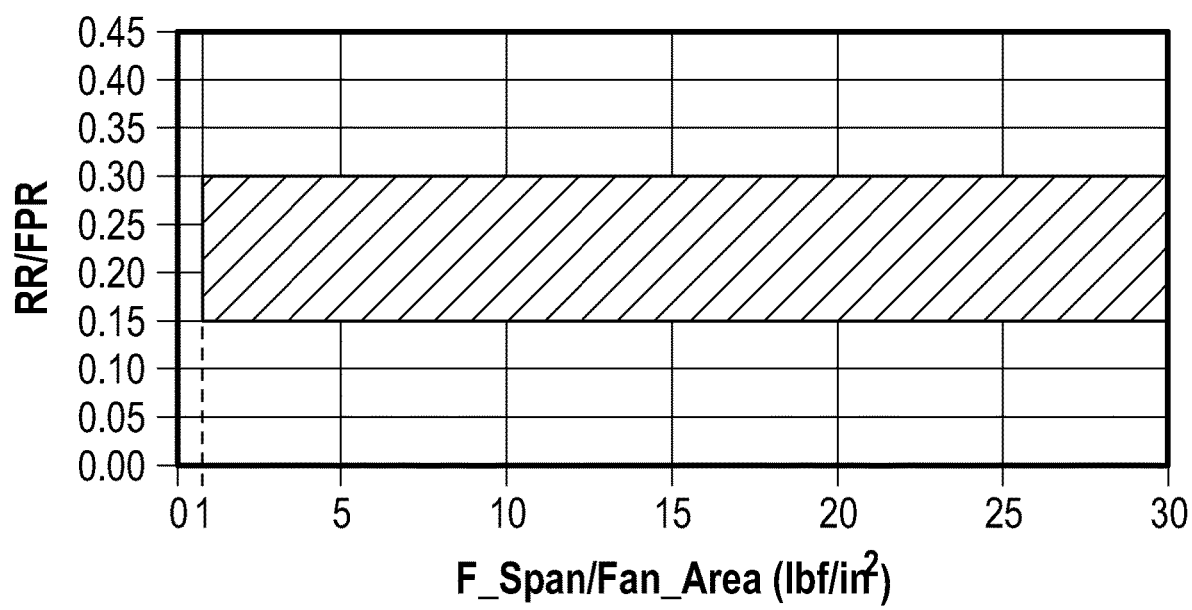
FIG. 14 depicts an exemplary range of a first VPF parameter relative to an exemplary range of a second VPF parameter, which can be particularly advantageous for a turbomachinery comprising a variable pitch fan.

As depicted in FIG. 14, in some examples, a VPF can be configured such that the first VPF parameter is or is about 0.15-0.30 and the second VPF parameter is or is about 1-30 lbf/in$^2$.

Figure 15:
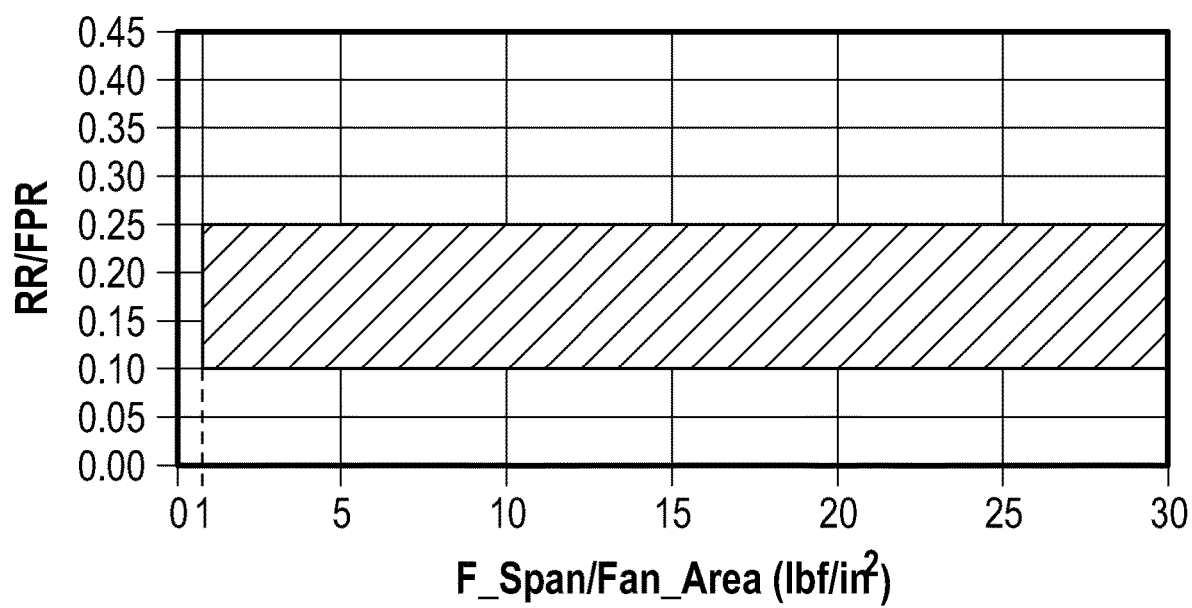
FIG. 15 depicts an exemplary range of a first VPF parameter relative to an exemplary range of a second VPF parameter, which can be particularly advantageous for a turbomachinery comprising a variable pitch fan.

As depicted in FIG. 15, in some embodiments, a VPF can be configured such that the first VPF parameter is or is about 0.10-0.25 and the second VPF parameter is or is about 1-30 lbf/in$^2$.

Figure 16:
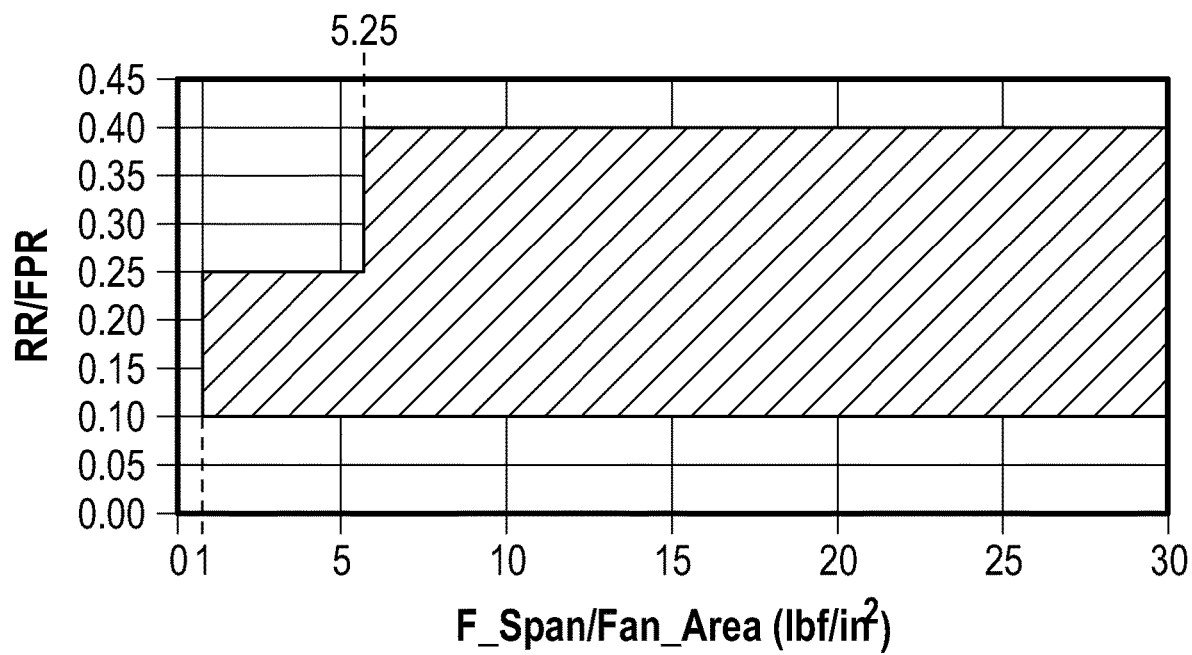
FIG. 16 depicts an exemplary range of a first VPF parameter relative to an exemplary range of a second VPF parameter, which can be particularly advantageous for a turbomachinery comprising a variable pitch fan.

Referring now to FIG. 16, in some examples, a VPF can be configured such that the first VPF parameter is or is about 0.1-0.25 and the second VPF parameter is or is about 1-30 lbf/in$^2$ or such that the first VPF parameter is or is about 0.1-0.4 and a second VPF factor is or is about 5.25-30 lbf/in$^2$.

Figure 17:
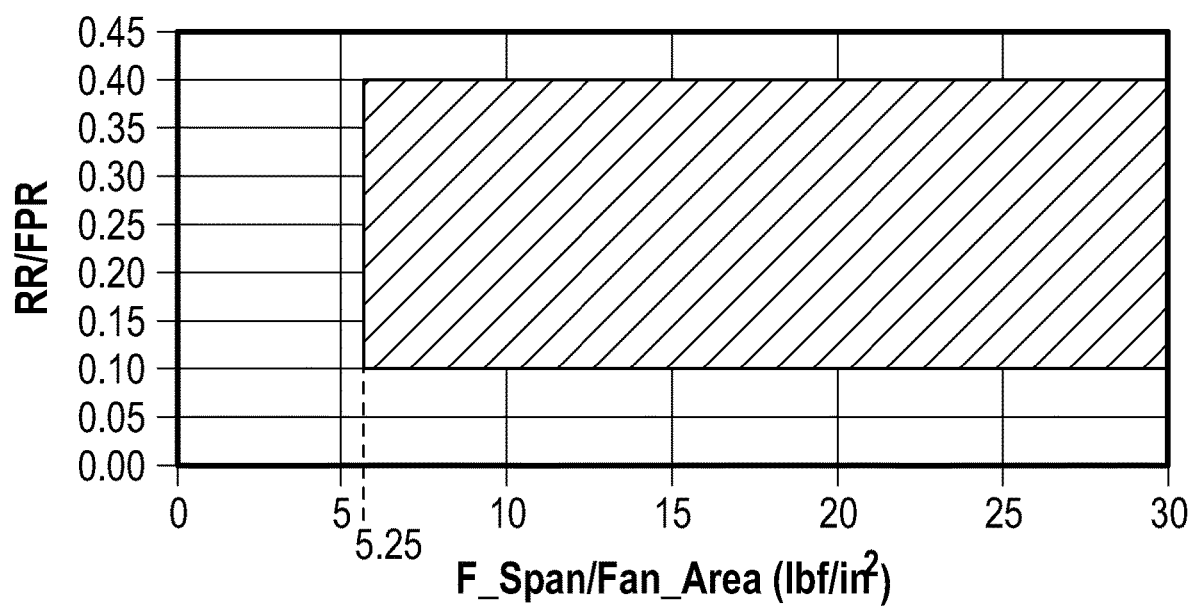
FIG. 17 depicts an exemplary range of a first VPF parameter relative to an exemplary range of a second VPF parameter, which can be particularly advantageous for a turbomachinery comprising a variable pitch fan.

With reference to FIG. 17, in some examples, a VPF can be configured such that the first VPF parameter is or is about 0.1-0.4 and the second VPF parameter is or is about 5.25-30 lbf/in². This range of VPF parameters can, for example, be particularly advantageous for ducted fans.

Figure 18:
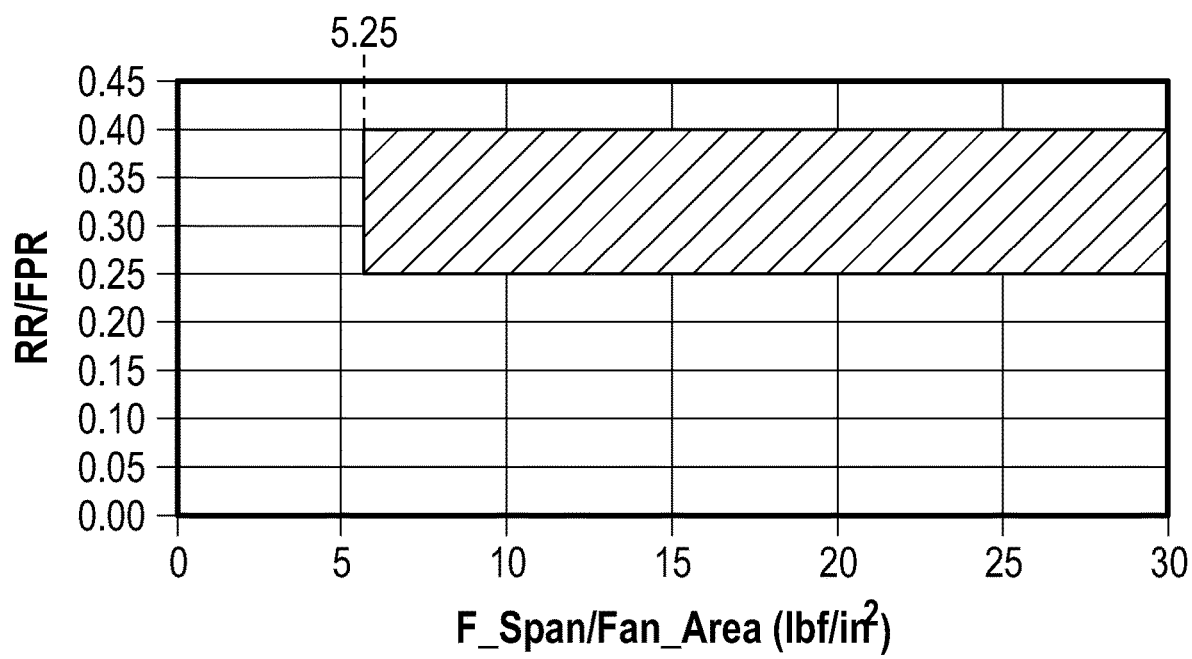
FIG. 18 depicts an exemplary range of a first VPF parameter relative to an exemplary range of a second VPF parameter, which can be particularly advantageous for a turbomachinery comprising a variable pitch fan.

With reference to FIG. 18, in some examples, a VPF can be configured such that the first VPF parameter is or is about 0.25-0.4 and the second VPF parameter is or is about 5.25-30 lbf/in².

As shown in FIG. 19, in some examples, a VPF can be configured such that the first VPF parameter is or is about 0.1-0.25 and the second VPF parameter is or is about 5.25-30 lbf/in².

Figure 20:
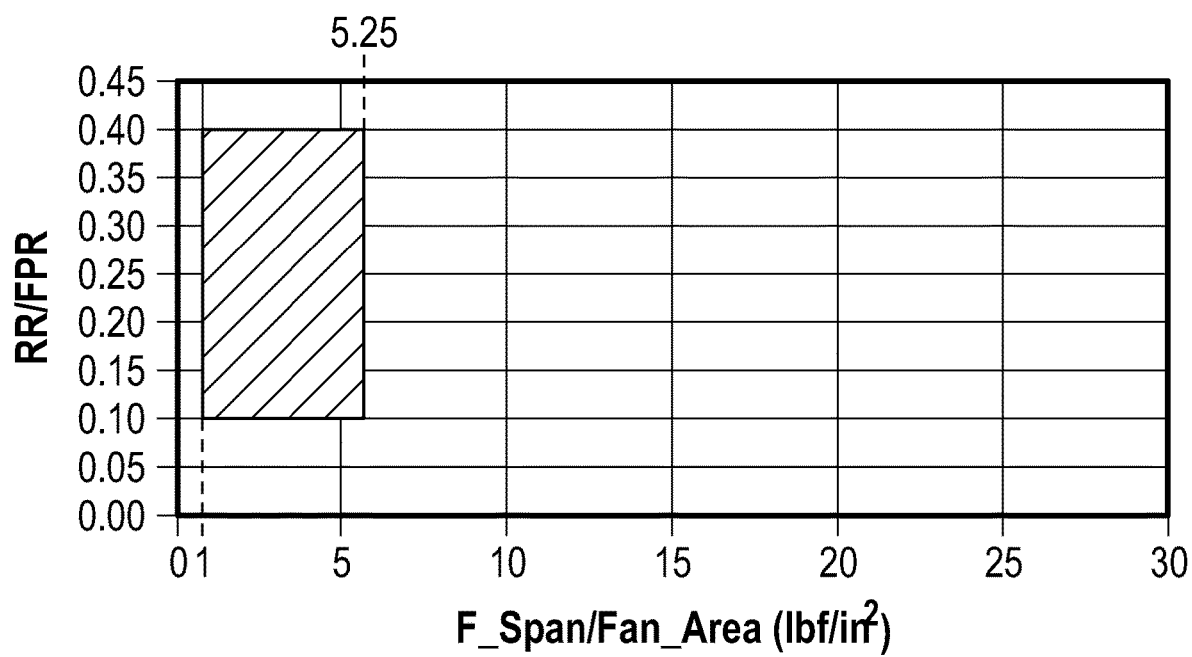
FIG. 20 depicts an exemplary range of a first VPF parameter relative to an exemplary range of a second VPF parameter, which can be particularly advantageous for a turbomachinery comprising a variable pitch fan.

As depicted in FIG. 20, in some examples, a VPF can be configured such that the first VPF parameter is or is about 0.10-0.40 and the second VPF parameter is or is about 1-5.25 lbf/in². This range of VPF parameters can, for example, be particularly advantageous for unducted fans.

Figure 21:
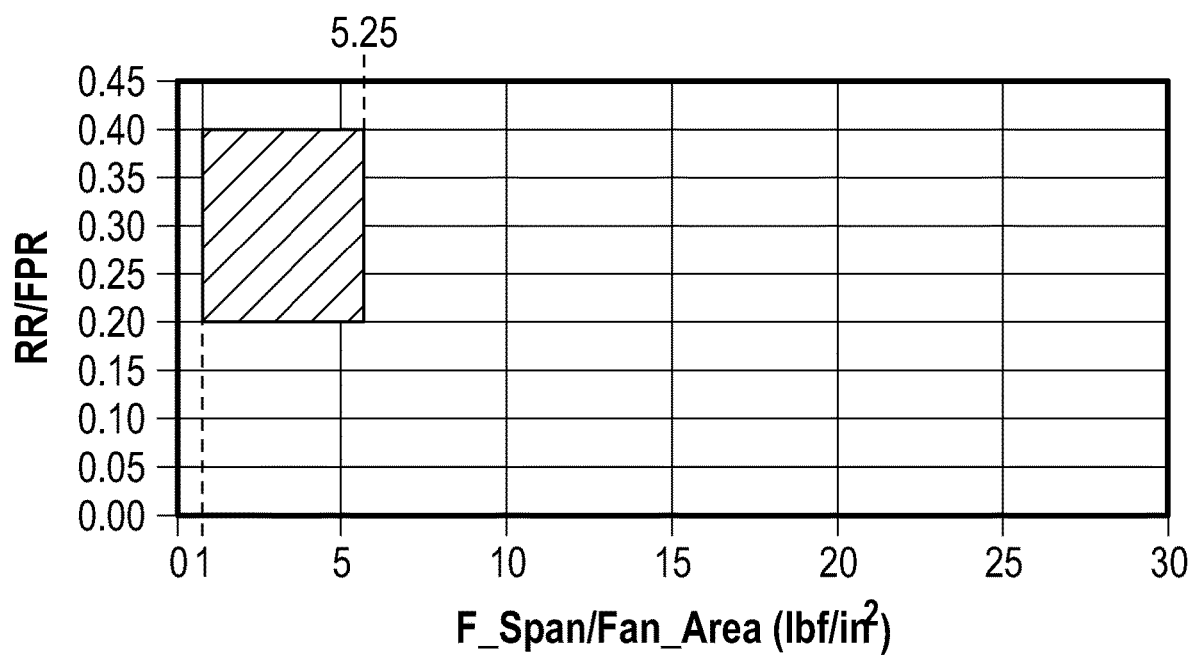
FIG. 21 depicts an exemplary range of a first VPF parameter relative to an exemplary range of a second VPF parameter, which can be particularly advantageous for a turbomachinery comprising a variable pitch fan.

As depicted in FIG. 21, in some examples, a VPF can be configured such that the first VPF parameter is or is about 0.20-0.40 and the second VPF parameter is or is about 1-5.25 lbf/in². This range can, for example, include fans with relatively high radius ratio. In some instances, these may be unducted fans. Configuring a fan such that it is within the range depicted in FIG. 21 can, for example, enable increased pitch change mechanism design space to help improve durability pitch change mechanism and/or improve compatibility with the gearbox.

Figure 22:
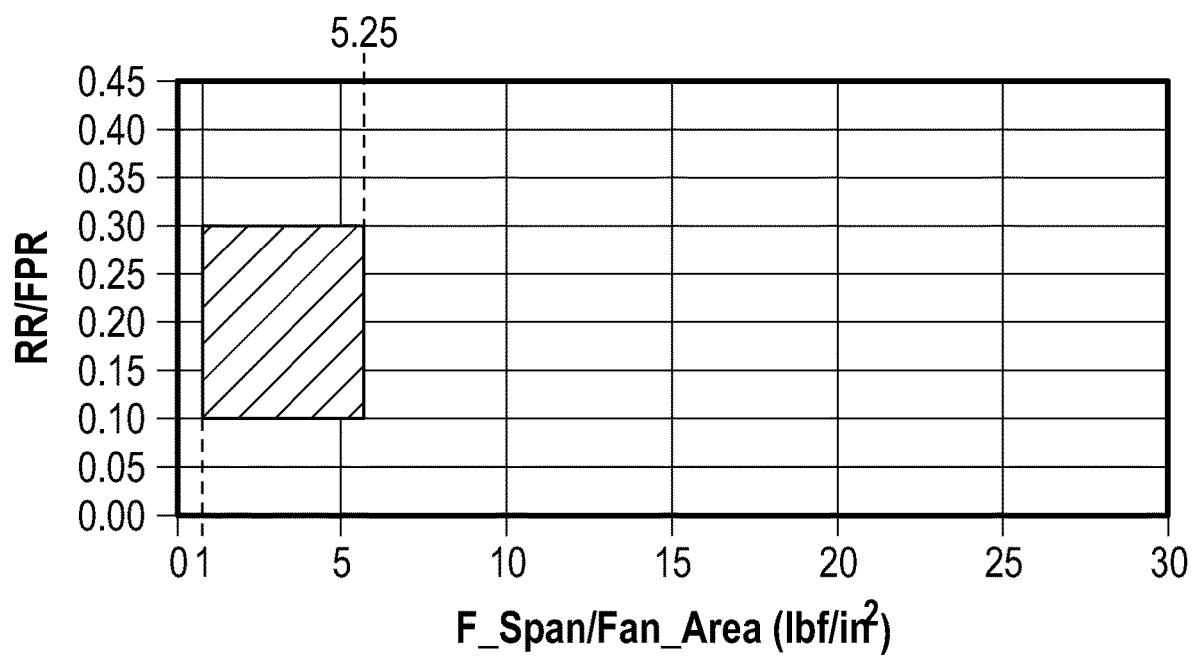
FIG. 22 depicts an exemplary range of a first VPF parameter relative to an exemplary range of a second VPF parameter, which can be particularly advantageous for a turbomachinery comprising a variable pitch fan.

As depicted in FIG. 22, in some examples, a VPF can be configured such that the first VPF parameter is or is about 0.10-0.30 and the second VPF parameter is or is about 1-5.25 lbf/in².

Figure 23:
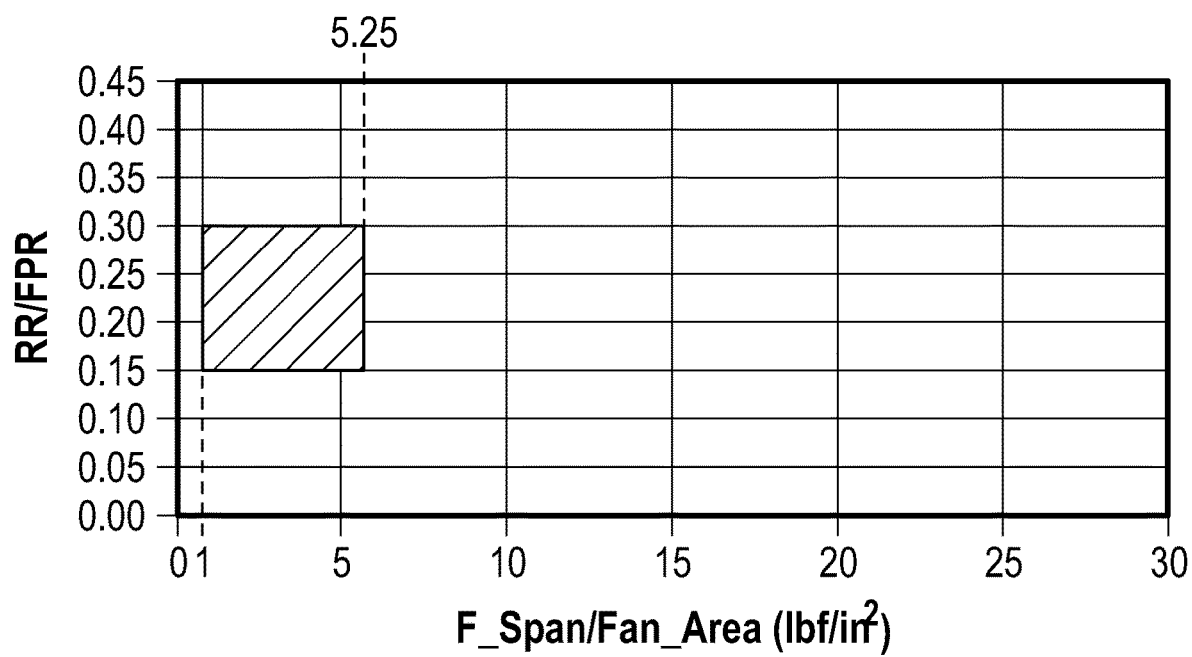
FIG. 23 depicts an exemplary range of a first VPF parameter relative to an exemplary range of a second VPF parameter, which can be particularly advantageous for a turbomachinery comprising a variable pitch fan.

As depicted in FIG. 23, in some examples, a VPF can be configured such that the first VPF parameter is or is about 0.15-0.30 and the second VPF parameter is or is about 1-5.25 lbf/in².

Figure 24:
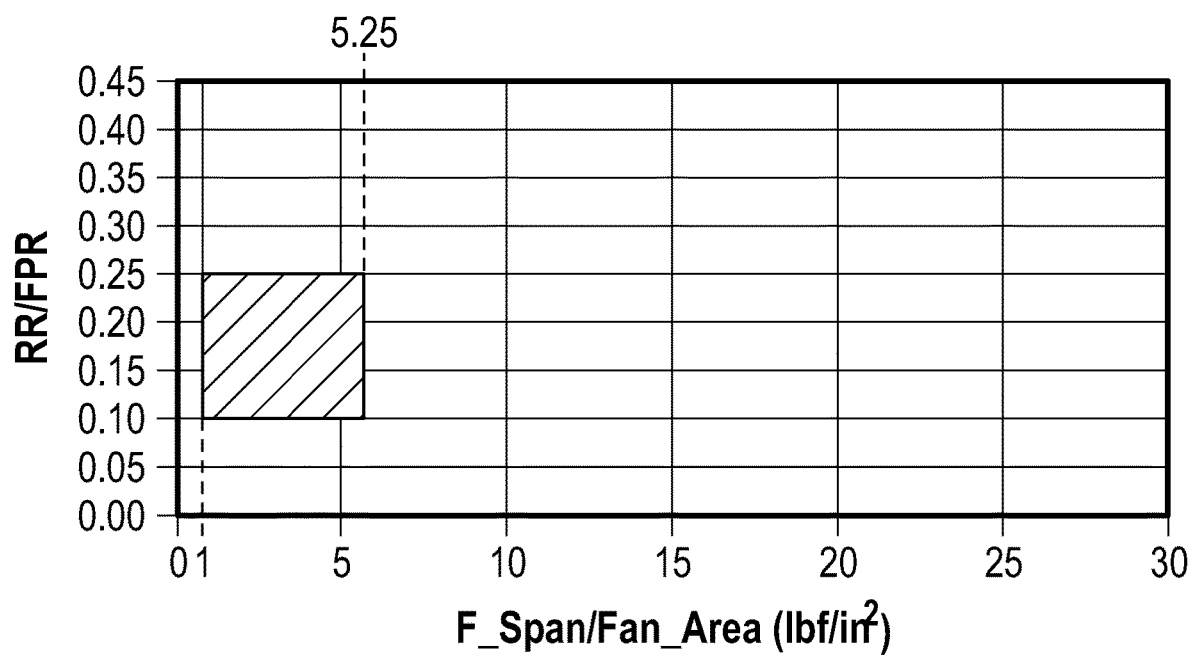
FIG. 24 depicts an exemplary range of a first VPF parameter relative to an exemplary range of a second VPF parameter, which can be particularly advantageous for a turbomachinery comprising a variable pitch fan.
Figure 27:
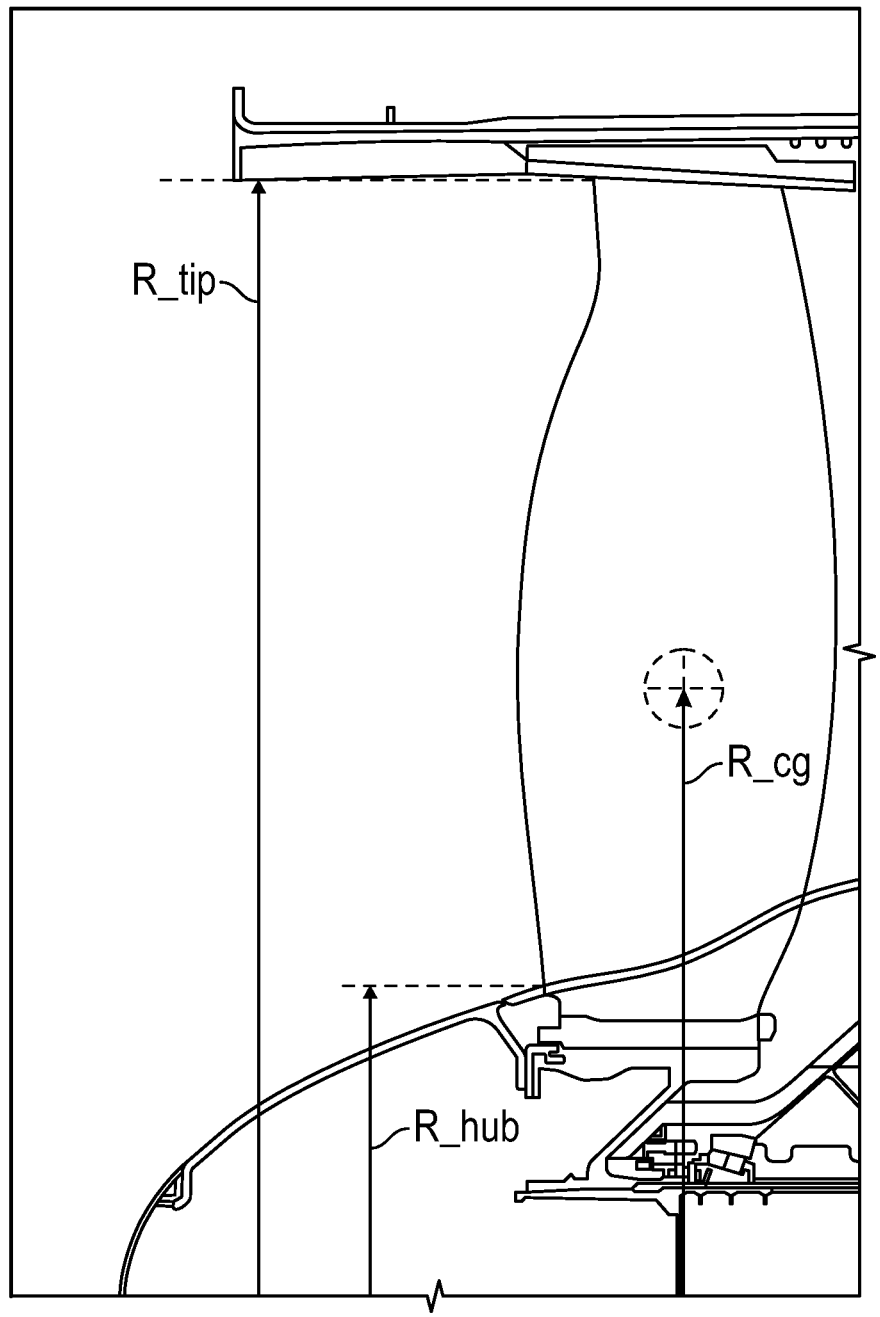
FIG. 27 depicts a partial cross-sectional schematic illustration of an exemplary embodiment of a turbomachinery engine configured with a ducted propulsion system and a variable pitch fan.

Referring to FIG. 24, in some examples, a VPF can be configured such that the first VPF parameter is or is about 0.1-0.25 and the second VPF parameter is or is about 1-5.25 lbf/in².

FIG. 25 comprises a table listing a plurality of exemplary ducted engines with a variable pitch fan, and FIG. 26 comprises a table listing a plurality of exemplary unducted engines with a variable pitch fan. The example engines of FIGS. 25-26 comprise first VPF parameters (i.e., RR/FPR) and second VPF parameters (i.e., F_span/Fan_area) that fall within one or more of the disclosed ranges of first and second VPF parameters depicted in FIGS. 12-24. FIGS. 25-26 also depicts various other parameters of the VPFs. It should be noted that in FIGS. 25-26 the fan tip speeds, fan redline speed (ω), and bearing spanwise force of the fan (F_span) are listed at a redline operating condition, and the fan pressure ratio (FPR) is listed at a static sea-level takeoff operating condition.

Thus, the exemplary engines listed in FIGS. 25-26 each define a variable pitch fan compatible with achieving, for example, a particular weight, size, and/or drag requirement, and/other factors relevant to the mechanical packaging of the engine. As discussed earlier, the disclosed engines and their VPFs account for other limitations (e.g., bearing stress), thereby allowing for adequate mechanical integration. As indicated in FIGS. 25-26, the disclosed VPF parameters are applicable to both unducted and ducted VPF designs. As explained earlier and demonstrated further in FIGS. 25-26, the relationship of the VPF parameters to turbomachinery embodiments discovered by the inventors provides a relatively quick and straightforward way of determining the feasibility of a particular VPF design.

Accordingly, the inventor's disclosed methods and VPF parameters can improve the design of ducted and unducted turbomachinery engines.

The fan blades disclosed herein (e.g., the fan blades 108, 208, 330, 408, and the fan blades listed in FIGS. 25-26) can comprise various materials. For example, in some instances, a fan can comprise a metal alloy. In some instances, the metal alloy can comprise aluminum, lithium, titanium, and/or other suitable metals for fan blades. In some instances, a fan can comprise composite material. In some examples, a fan can comprise a metal alloy core and a composite cover.

Various pitch change mechanisms can be adopted for varying fan blade pitch for the examples disclosed herein (e.g., those in FIGS. 25-26). These pitch change mechanisms can comprise various components including actuators, kinematic mechanisms, counterweights, pitch-locking mechanisms, and blade bearings.

In some examples, an actuator can comprise one or more of rotary motion and linear motion. In some instances, an actuator can be driven hydraulically and/or electrically. In some examples, an actuator can reside on an engine centerline axis. In some examples, an actuator can reside offset from an engine centerline axis.

Various kinematic mechanisms can be used. For example, adjustable linkages with a unison ring to a blade crank can be used. In some examples, an actuator yoke to a blade crank can be used. In some examples, a quill shaft driven via gears to blade root, in unison or individually, can be used.

Various types of counterweights can be used. For example, in some instances, counterweights directly mounted to the blade root can be used. In some examples, counterweights in a remote position, driven by gears can be used. In some examples, counterweights with a remote position, driven by levers and linkages can be used.

Various pitch-locking mechanisms can be used. In some examples, a pitch-locking mechanism comprises a ball-screw mechanism. In some examples, pitch-locking is accomplished via hydraulic chamber manipulation. In some examples, a pitch-locking mechanism includes locking via a clutch plate.

Various types of blade bearing can be used in a pitch change mechanism. For example, a duplex combination of tapered roller, spherical roller, and/or ball bearings can be used. In some instances, a preloading device above, below, or between the bearing pair can be used. The bearings can comprise various materials including metal (e.g., steel) and/or ceramic.

A variable pitch fan can comprise a plurality of fan blades. Each of the fan blades can be rotatably attached to a disk about respective pitch axes, and the disk may be rotatable about a central axis by the one or more shafts of the core. For example, each fan blade can be attached to a trunnion mechanism which extends through an individual disk segment of the disk. The trunnion mechanism can, in turn, be retained within a respective disk segment by a keyed connection. For example, the trunnion mechanism may define a key slot and the disk segment may include a support surface. A key positioned in the key slot interacts with the key slot and the support surface to retain the trunnion mechanism within the respective disk segments.

Figure 28:
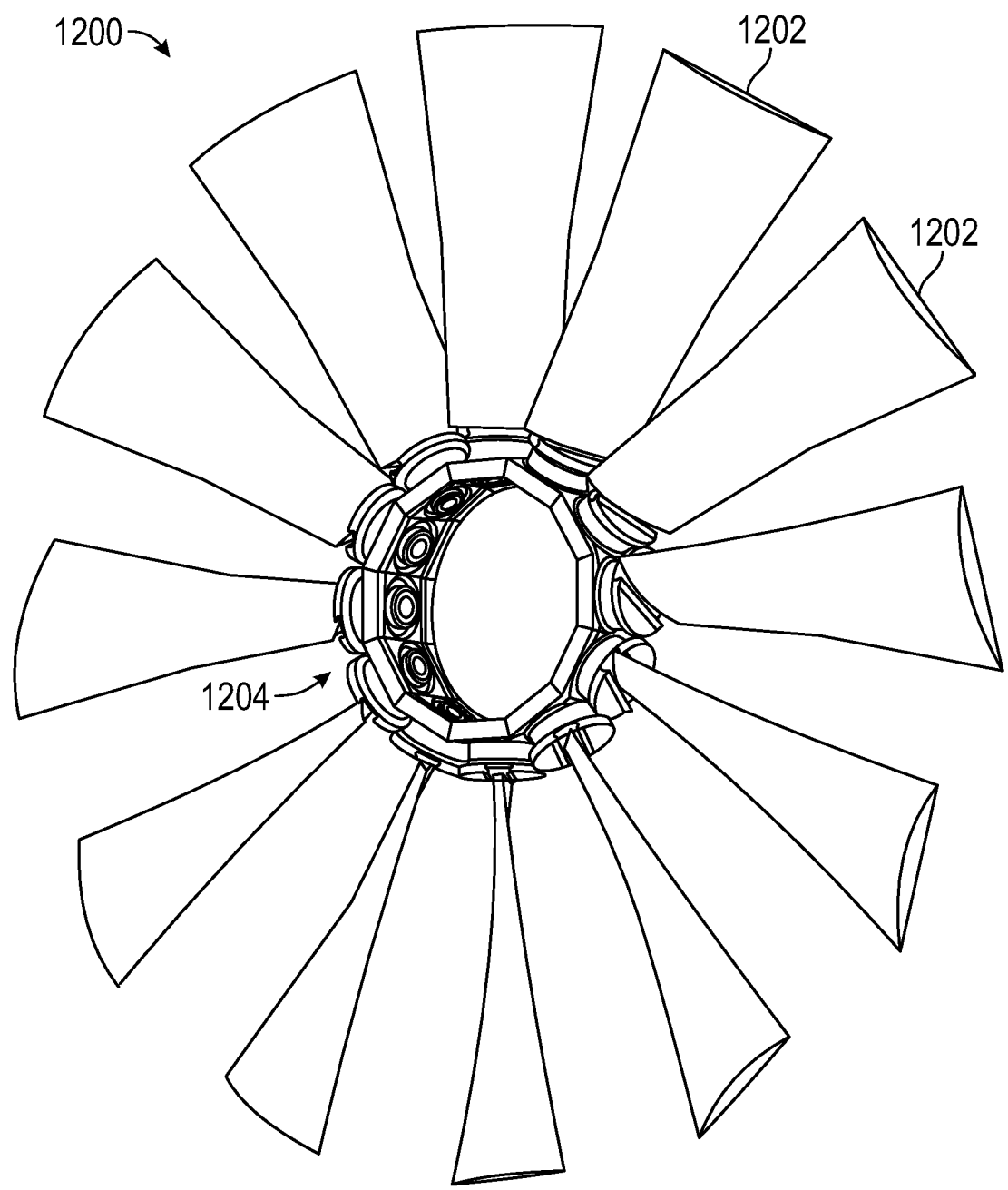
FIG. 28 is perspective view of a variable pitch fan of the exemplary turbomachinery engines disclosed herein.
Figure 29:
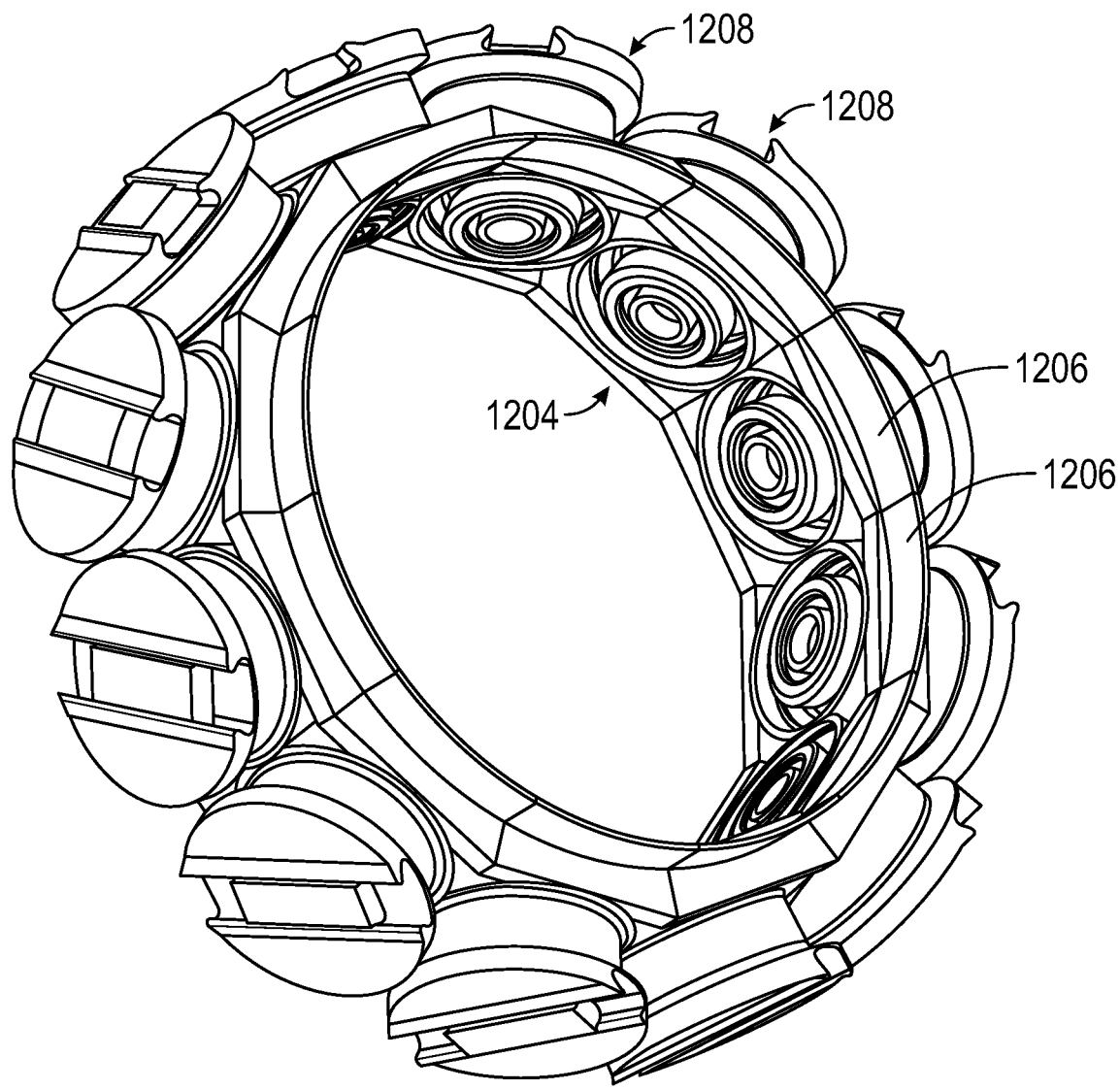
FIG. 29 is a perspective view of a disk and trunnion mechanisms of the exemplary variable pitch fan of FIG. 28.

Referring now to FIGS. 28-29, a variable pitch fan assembly 1200 will be described in greater detail. The variable pitch fan assembly 1200 can be used with any of the engines disclosed herein. The variable pitch fan assembly 1200 (also referred to herein as "the fan 1200") comprises a plurality of fan blades 1202 and a disk 1204. FIG. 28 provides a perspective view of the fan 1200. FIG. 29 provides a perspective view of the disk 1204.

In the depicted example, the fan 1200 includes twelve (12) fan blades 1204. Various other fan blade counts can be used. In some examples, the fan 1200 can be configured as an open rotor and comprise 8-16 fan blades. In some examples, the fan 1200 can be configured as a ducted rotor and comprise 16-22 fan blades.

The fan 1200 can have a diameter of 72-216 inches. In some examples, the fan 1200 can have a diameter of 100-200 inches. In some examples, the fan 1200 can have a diameter of 120-190 inches. In some examples, the fan 1200 can have a diameter of 72-120 inches. In some examples, the fan 1200 can have a diameter of 80-100 inches. In some examples, the fan 1200 can have a diameter of 50-80 inches.

The fan 1200 may have any suitable blade count and any suitable diameter, including those explicitly disclosed herein.

Referring to FIG. 29, the disk 1204 includes a plurality of disk segments 1206 that are rigidly coupled together or integrally molded together in a generally annular shape (e.g., a polygonal shape). Each fan blade 1202 is coupled to a respective disk segment 1206 at a trunnion mechanism 1208 that facilitates retaining the fan blade 1202 on the disk 1204 during rotation of disk 1204 (i.e., the trunnion mechanism 1208 facilitates providing a load path to disk 1204 for the centrifugal load generated by the fan blades 1202 during rotation about an engine centerline axis), while still rendering its associated fan blade 1202 rotatable relative to disk 1204 about pitch axis P (FIG. 32).

Figure 30:
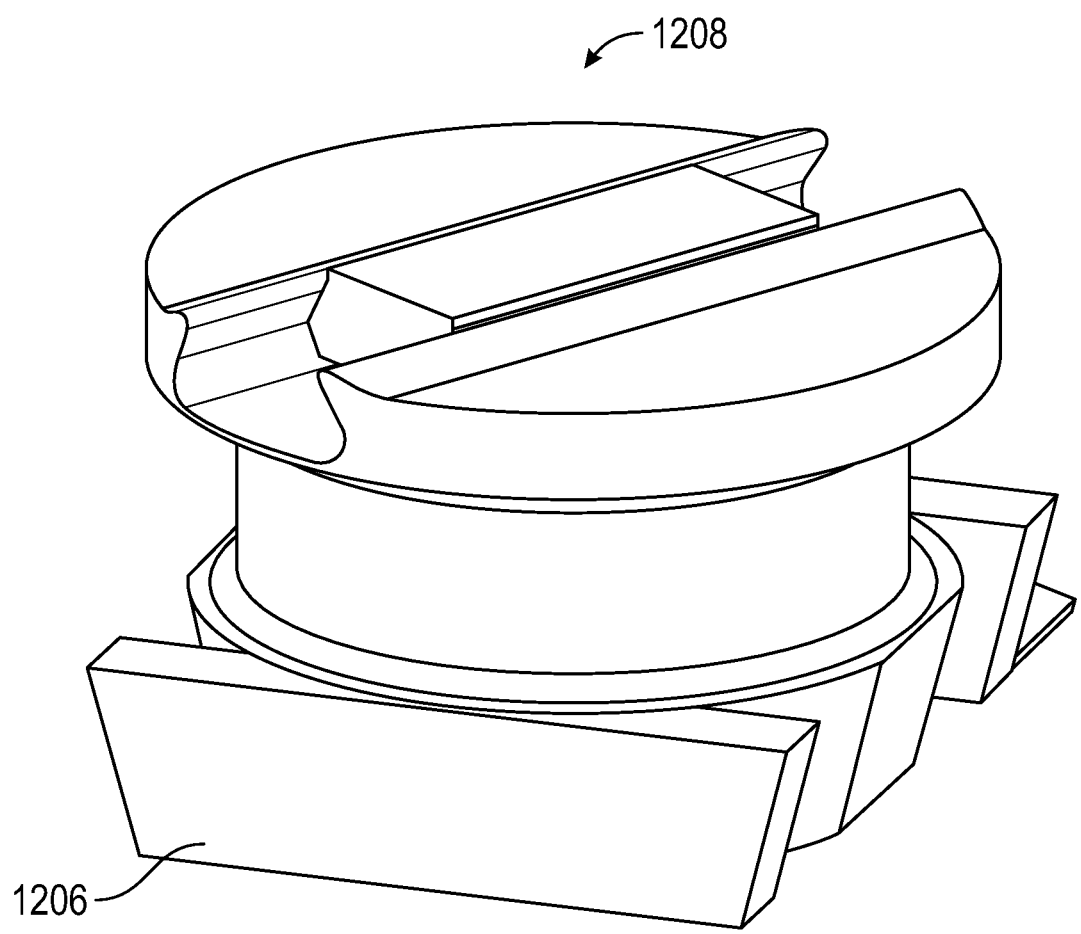
FIG. 30 is a perspective view of a segment of the disk and one of the associated trunnion mechanisms of FIG. 29.
Figure 31:
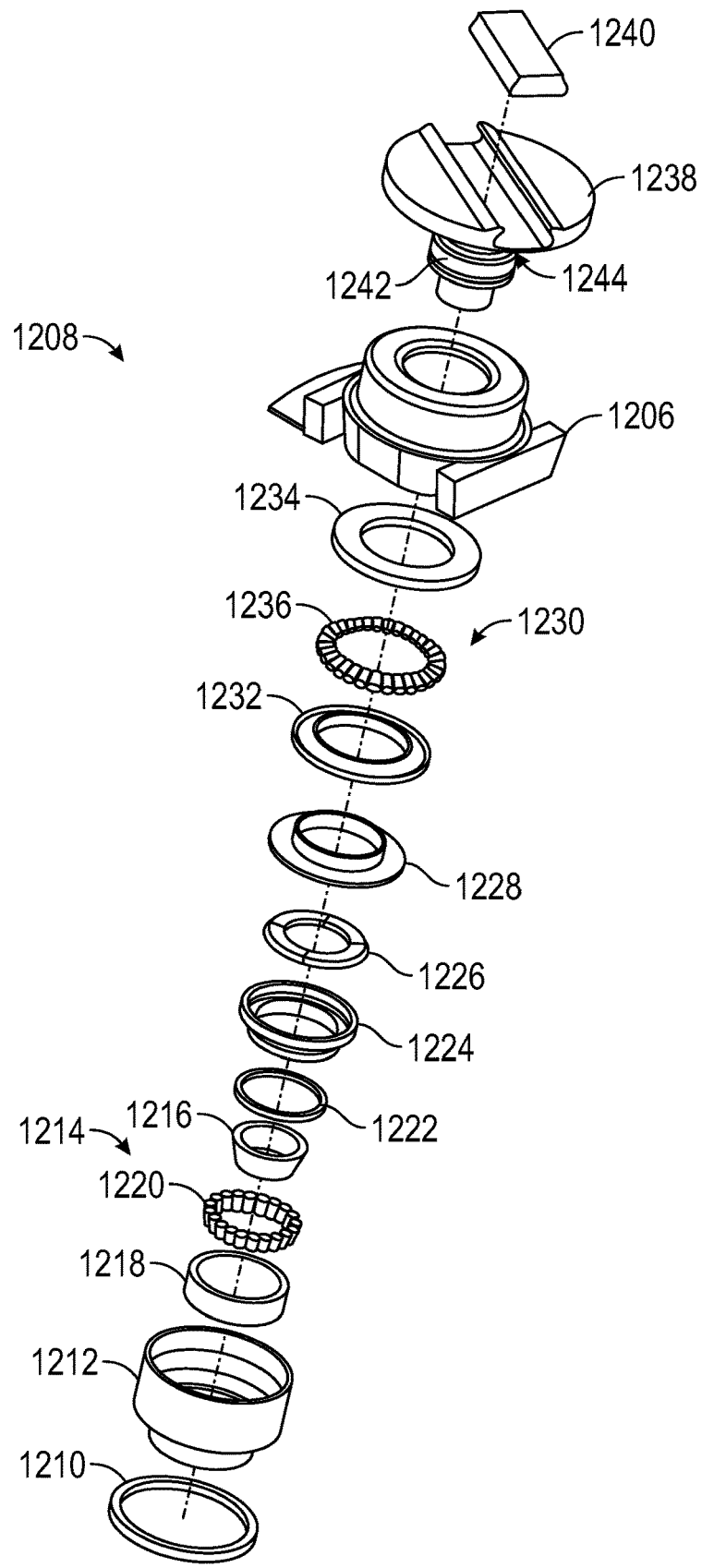
FIG. 31 is an exploded view of the trunnion mechanism shown in FIG. 29.
Figure 32:
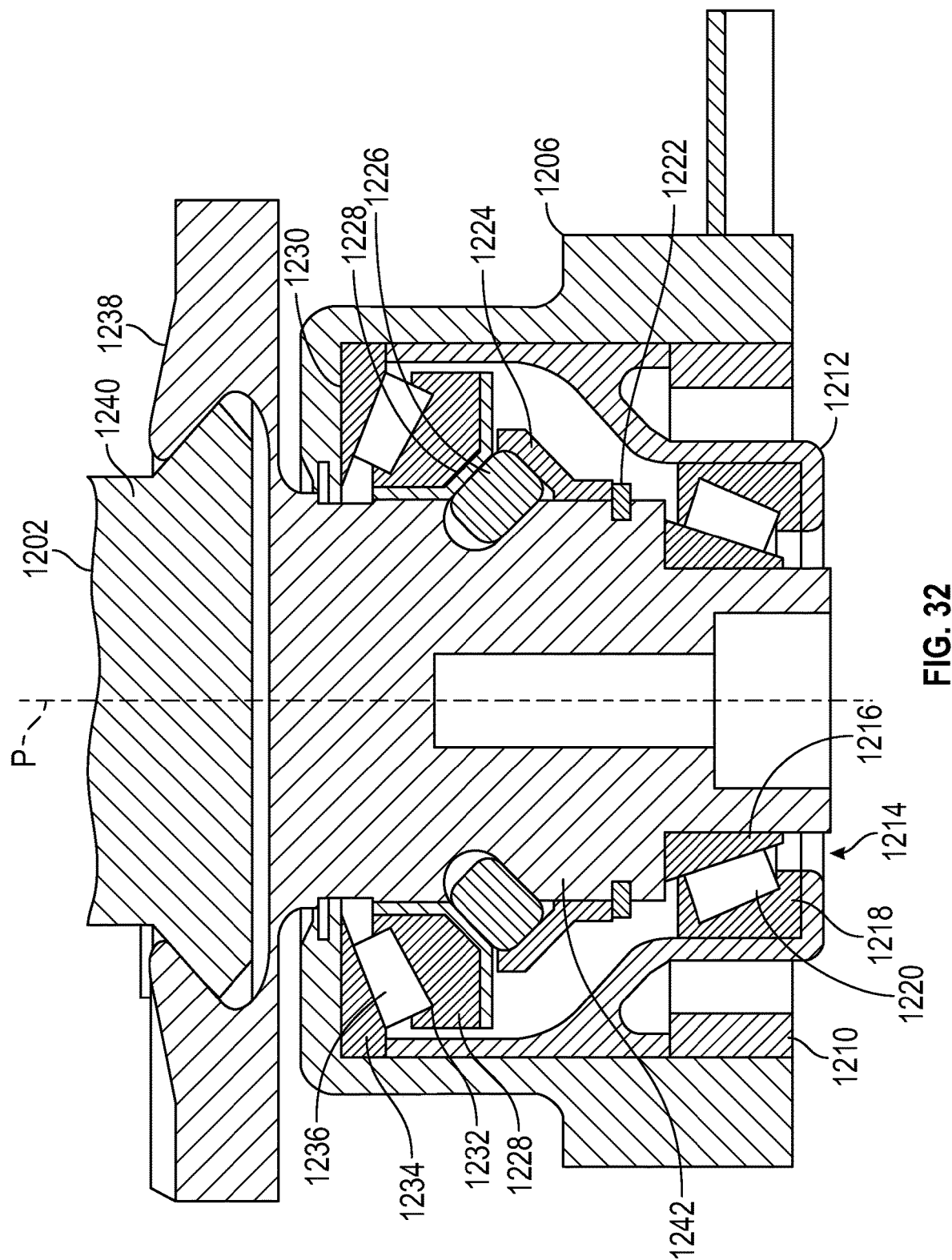
FIG. 32 is a cross-sectional view of the segment of the disk and the trunnion mechanism of FIG. 30 with a blade attached to the trunnion mechanism.

Referring now to FIGS. 30-32, an individual disk segment 1206 and trunnion mechanism 1208 in accordance with an example is depicted. More specifically, FIG. 30 provides an assembled perspective view of the exemplary disk segment 1206 and trunnion mechanism 1208. FIG. 31 provides an exploded, perspective view of the exemplary disk segment 1206 and trunnion mechanism 1208. FIG. 32 provides a side, cross-sectional view of the exemplary disk segment 1206 and trunnion mechanism 1208.

In the exemplary embodiment depicted, each trunnion mechanism 1208 extends through its associated disk segment 1206 and includes: a coupling nut 1210; a lower bearing support 1212; a first line contact bearing 1214 (having, for example, an inner race 1216, an outer race 1218, and a plurality of rollers 1220); a snap ring 1222; a key hoop retainer 1224; a key 1226; a bearing support 1228; a second line contact bearing 1230 (having, for example, an inner race 1232, an outer race 1234, and a plurality of rollers 1236); and a trunnion 1238 which receives a dovetail 1240 of a fan blade 1202. In alternative embodiments, however, the trunnion 1238 may be integrated into a hub of the fan blade 1202 as a spar attachment or an additional key may be inserted into overlapping openings of the hub of the fan blade 1202 and trunnion 1238 to form a pinned root. For use as bearings 1214, 1230, at least the following types of line contacting type rolling element bearings are contemplated: cylindrical roller bearings; cylindrical roller thrust bearings; tapered roller bearings; spherical roller bearings; spherical roller thrust bearings; needle roller bearings; and tapered roller needle bearings. Additionally, the bearings may be formed of any suitable material, such as a suitable stainless steel or other metal material, or alternatively of any suitable non-ferrous material.

Referring particularly to FIG. 32, in the exemplary embodiment depicted, the first line contact bearing 1214 is oriented at a different angle than the second line contact bearing 1230. More specifically, line contact bearings 1214, 1230 are preloaded against one another in a face-to-face (or duplex) arrangement, wherein centerline axes of the bearings 1214, 1230 are oriented substantially perpendicular to one another.

It should be appreciated, however, that in other exemplary embodiments, the line contact bearings 1214, 1230 may instead be arranged in tandem so as to be oriented substantially parallel to one another. It should also be appreciated that in other exemplary embodiments, the trunnion mechanism 1208 may additionally or alternatively include any other suitable type of bearing, formed of any suitable material. For example, in other exemplary embodiments, the trunnion mechanism 1208 may include roller ball bearings or any other suitable bearing.

When assembled, the coupling nut 1210 is threadably engaged with disk segment 1206 so as to sandwich the remaining components of trunnion mechanism 1208 between coupling nut 1210 and disk segment 1206, thereby retaining trunnion mechanism 1208 attached to disk segment 1206. Moreover, as is depicted, the individual disk segment 1206 and trunnion mechanism 1208 depicted includes a keyed configuration for carrying a centrifugal load of the fan blade 1202 during operation. The centrifugal load, which may generally be a function of a mass of the fan blade 1202 and a rotational speed of the fan blade 1202, can be relatively high during operation of the fan 1200 of the engine.

Additional details of the variable pitch fan 1200 and its pitch change mechanism can be found in U.S. Pat. No. 10,100,653, which is incorporated by reference.

Figure 33:
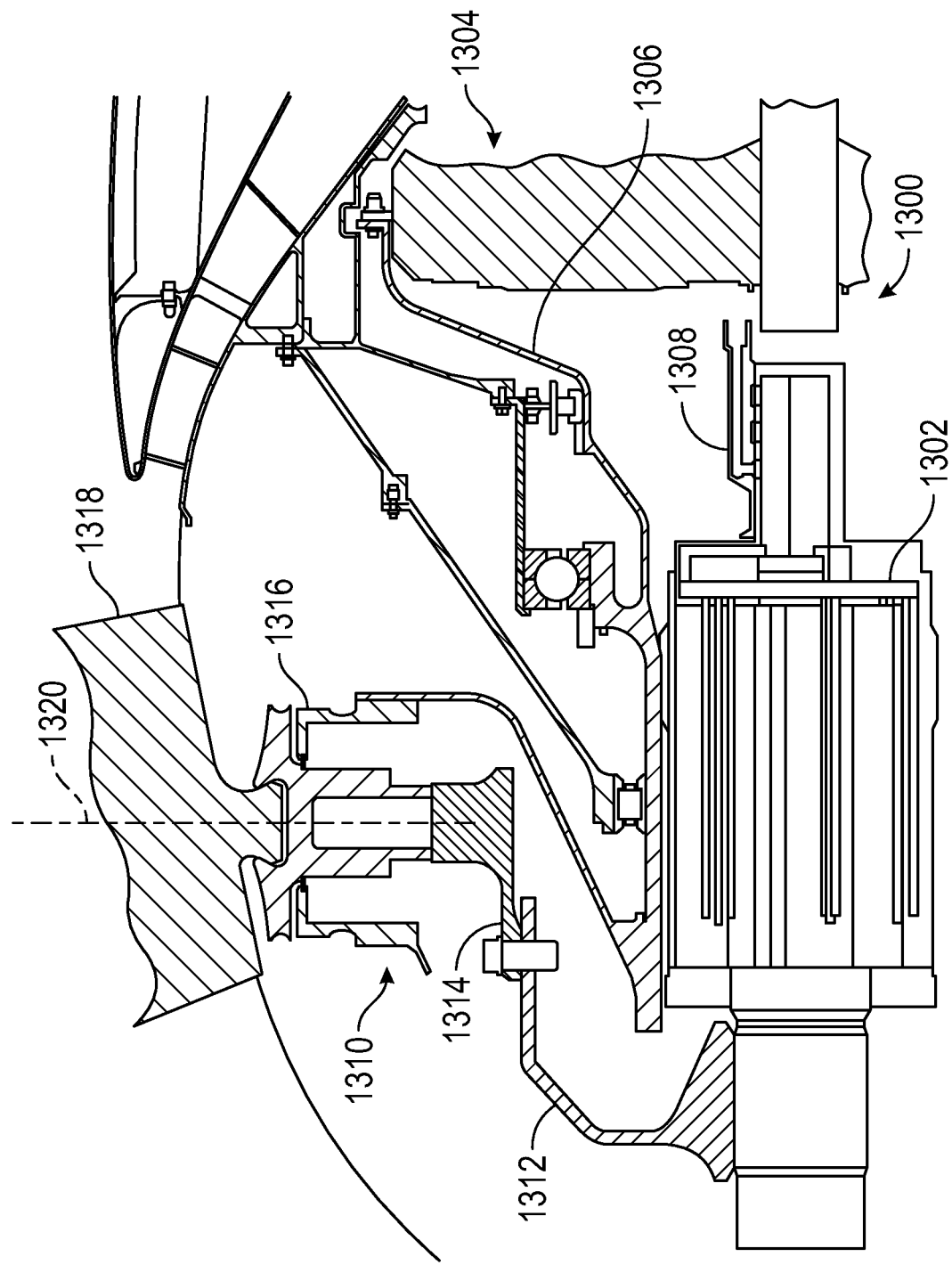
FIG. 33 is a side elevation view of a gas turbine engine fan rotor assembly including a hydraulic pitch change mechanism actuator assembly.

FIG. 33 is a side elevation view of a variable pitch fan assembly 1300 including an integrated pitch change mechanism (PCM) actuator assembly 1302. The variable pitch fan assembly 1300 (which can also be referred to as "the fan 1300") can be used with any of the engines disclosed herein. The PCM actuator assembly 1302 comprises a hydraulic actuation mechanism. The fan 1300 includes the integrated PCM actuator assembly 1302, an epicyclic gearbox 1304, a power engine rotor 1306, a stationary hydraulic fluid transfer sleeve 1308, and a hub assembly 1310. Hub assembly 1310 includes a unison ring 1312, a plurality of fan blade trunnion yokes 1314, a plurality of trunnion assemblies 1318, and a plurality of fan blades 1316. In some embodiments, a low-pressure shaft is fixedly coupled to epicyclic gearbox 1304 which is rotationally coupled to power engine rotor 1306. Power engine rotor 1306 is rotationally coupled to hub assembly 1310 and integrated PCM actuator assembly 1302 which is rotationally coupled to unison ring 1312 through integrated PCM actuator assembly 1302. Hub assembly 1310 is rotationally coupled to fan blades 1318. Unison rings 1312 are rotationally coupled to fan blade trunnion yokes 1314 which are rotationally coupled to trunnion assemblies 1316. Trunnion assemblies 1316 are rotationally coupled to fan blades 1318. Stationary hydraulic fluid transfer sleeve 1308 is coupled to supports within epicyclic gearbox 1304 and circumscribes integrated PCM actuator assembly 1302. Stationary hydraulic fluid transfer sleeve 1308 is coupled in flow communication with integrated PCM actuator assembly 1302.

In operation, the low-pressure shaft is configured to rotate a plurality of gears within epicyclic gearbox 1304 which are configured to rotate power engine rotor 1306. Power engine rotor 1306 is configured to rotate integrated PCM actuator assembly 1302 which is configured to rotate unison rings 1312. Unison ring 1312 is configured to rotate fan blade trunnion yokes 1314 which are configured to rotate trunnion assemblies 1316. Trunnion assemblies 1316 are configured to rotate fan blades 1318 about their respective axis. Stationary hydraulic fluid transfer sleeve 1308 is configured to remain stationary while integrated PCM actuator assembly 1302 is configured to rotate along with the fan module.

Stationary hydraulic fluid transfer sleeve 1308 is coupled in flow communication with integrated PCM actuator assembly 1302. Hydraulic fluid pressure from stationary hydraulic fluid transfer sleeve 1308 actuates integrated PCM actuator assembly 1302 which rotates unison ring 1312 about a radially extending pitch axis of rotation 1320. Unison ring 1312 translates fan blade trunnion yokes 1314 along an arcuate path, which rotate respective trunnion assemblies 1316 about radially extending pitch axis of rotation 1320. Trunnion assemblies 1316 are configured to rotate fan blades 1318 about radially extending pitch axis of rotation 1320.

Additional details regarding the fan 1300 and the hydraulic PCM 1302 can be found in U.S. Pat. No. 10,393,137, which is incorporated by reference.

Figure 34:
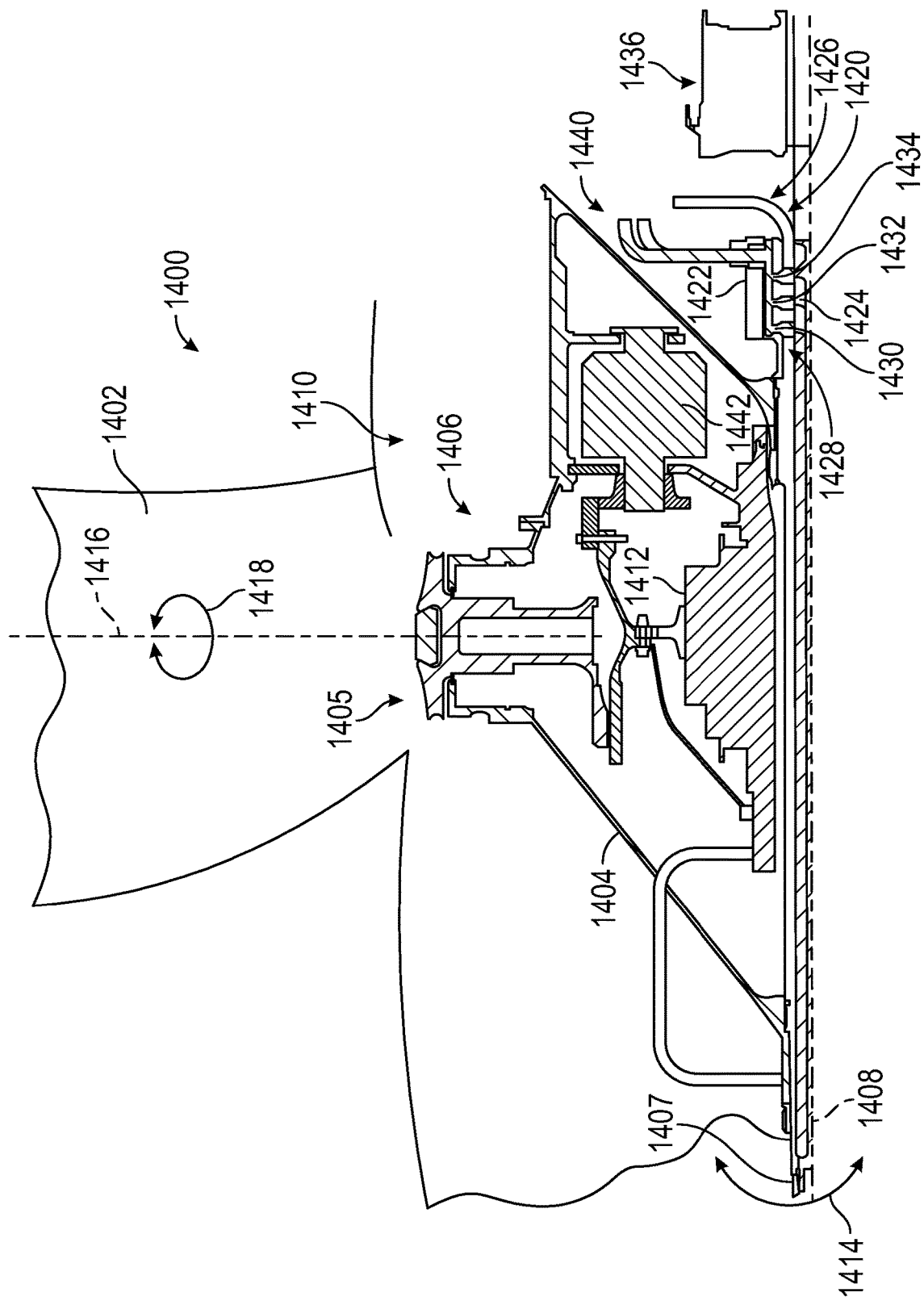
FIG. 34 is a cross-sectional view of a portion of a fan assembly that may be implemented with the turbomachinery engines disclosed herein.

FIG. 34 is a cross-sectional view of a portion of a variable pitch fan assembly 1400, which can be used with any one of the engines disclosed herein. Fan assembly 1400 includes a plurality of blades 1402 (though only one blade is 1402 is shown in FIG. 34) mounted on a rotatable frame 1404. More specifically, blades 1402 are retained within blade retention mechanisms 1405 of an annular fan hub 1406. Moreover, blades 1402 are disposed symmetrically about a shaft 1407 (e.g., a low-pressure shaft). Shaft 1407 defines a shaft axis 1408, which is co-axial with an engine centerline. Accordingly, shaft axis 1408 may be referred to herein as "engine centerline axis 1408." Fan assembly 1400 further includes a pitch control mechanism (PCM) 1410 for controlling a pitch of blades 1402. PCM 1410 includes a single master hydraulic actuator 1412 positioned axisymmetric with respect to centerline 1408 and fan assembly 1400. In the illustrated embodiment, hydraulic actuator 1412 is a rotary actuator configured to rotate about an axis defined by engine centerline 1408, as indicated by arrow 1414. In one embodiment, hydraulic actuator 1414 circumscribes shaft 1407.

Hydraulic actuator 1412 is configured to angularly displace blades 1402 of fan assembly 1400 between a first position and a second position. More specifically, hydraulic actuator 1412 drives rotation of blades 1402 about respective pitch axes 1416. In the illustrated embodiment, hydraulic actuator 1412 is configured to angularly displace blades 1402 upon rotation of hydraulic actuator 1412. The angular displacement of blades 1402 around pitch axes 1416 is indicated generally by arrow 1418.

PCM 1410 also includes a hydraulic fluid transfer system, including a power gearbox 1436 configured to drive hydraulic fluid (e.g., hydraulic oil) through shaft 1407 to hydraulic actuator 1412. Gearbox 1436 may be a star gearbox, such that hydraulic fluid is channeled therethrough, a planetary gearbox, in which the hydraulic is transferred therearound, or another suitable gearbox configuration (including those disclosed herein). Hydraulic fluid transfer system also includes a hydraulic fluid transfer sleeve 1420, such as, for example, a hydraulic oil transfer "slip ring," in fluid communication with gearbox 1436. Hydraulic transfer sleeve 1420 includes a stationary member 1422, fixed relative to fan assembly 1400, and a rotatable member 1424, which rotates with hydraulic actuator 1412. Hydraulic fluid transfer sleeve 1420 is configured to transfer a flow of pressurized hydraulic fluid, for example, hydraulic oil, across a gap 1426 between stationary member 1422 and rotatable member 1424. In the example embodiment, PCM 1410 further includes a plurality of hydraulic fluid supply lines 1428 coupled in flow communication between hydraulic actuator 1412 and hydraulic fluid transfer sleeve 1420. The plurality of fluid supply lines 1428 includes a first supply line 1430, configured to channel pressurized fluid to hydraulic actuator 1412 to increase pitch of blades 1402, a second supply line 1432, configured to channel pressurized fluid to hydraulic actuator 1412 to decrease pitch of blades 1402, and a third supply line 1434 configured to facilitate draining at least a portion of hydraulic actuator 1412.

PCM 1410 includes a remote counterweight system 1440. Remote counterweight system 1440 includes a plurality of counterweights 1442 configured to affect a position of blades 1402, for example, when fluid pressure in PCM 1410 is outside a predetermined range. Remote counterweight system 1440 is remote from blade retention mechanisms 1405.

Additional details regarding the fan 1400 and its PCM 1410 can be found in U.S. Pat. No. 10,533,436, which is incorporated by reference.

This written description uses examples to disclose the technology, including the best mode, and also to enable any person skilled in the art to practice the disclosed technology, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the disclosure are provided by the subject matter of the following examples:

Example 1. A turbomachinery engine comprising a fan assembly, a pitch change mechanism, a vane assembly, a core engine, and a gearbox. The fan assembly includes a plurality of fan blades, a first VPF parameter, and a second VPF parameter. The first VPF parameter is defined by a fan blade radius ratio (RR) divided by a fan pressure ratio (FPR) at a static sea-level takeoff operating condition. The second VPF parameter is defined by a bearing spanwise force (F_Span) at a redline operating condition measured in pounds force divided by a fan area (F_Area) measured in square inches. The first VPF parameter is within a range of 0.1 to 0.25 and the second VPF parameter is within a range of 2-30 lbf/in$^2$, or the first VPF parameter is within a range of 0.1 to 0.4 and the second VPF parameter is within a range of 5.25-30 lbf/in$^2$. The pitch change mechanism is coupled to the plurality of fan blades and configured for adjusting a pitch of the plurality of fan blades. The vane assembly includes a plurality of vanes disposed aft of the fan blades. The core engine includes one or more compressor sections and one or more turbine sections. The gearbox includes an input and an output. The input is coupled to the one or more turbine sections of the core engine and comprises a first rotational speed, and the output is coupled to the fan assembly and has a second rotational speed which is less than the first rotational speed.

Example 2. The turbomachinery engine of any example herein, and particularly example 1, wherein the plurality of fan blades is 8-20 fan blades.

Example 3. The turbomachinery engine of any example herein, and particularly example 1 or example 2, wherein the plurality of fan blades is 12-16 fan blades.

Example 4. The turbomachinery engine of any example herein, and particularly any one of examples 1-3, wherein the plurality of fan blades is exactly 12-14 fan blades.

Example 5. The turbomachinery engine of any example herein, and particularly any one of examples 1-4, wherein the RR is within a range of 0.125-0.55.

Example 6. The turbomachinery engine of any example herein, and particularly any one of examples 1-5, wherein the RR is within a range of 0.2-0.5.

Example 7. The turbomachinery engine of any example herein, and particularly any one of examples 1-6, wherein the RR is within a range of 0.25-0.35.

Example 8. The turbomachinery engine of any example herein, and particularly any one of examples 1-6, wherein the RR is within a range of 0.25-0.3.

Example 9. The turbomachinery engine of any example herein, and particularly any one of examples 1-8, wherein the FPR at the static sea-level takeoff operating condition is within a range of 1.05-1.5.

Example 10. The turbomachinery engine of any example herein, and particularly any one of examples 1-9, wherein the FPR at the static sea-level takeoff operating condition is within a range of 1.05-1.15.

Example 11. The turbomachinery engine of any example herein, and particularly any one of examples 1-9, wherein the FPR at the static sea-level takeoff operating condition is within a range of 1.2-1.4.

Example 12. The turbomachinery engine of any example herein, and particularly any one of examples 1-11, wherein the F_Span at the redline operating condition is within a range of 20,000-200,000 lbf.

Example 13. The turbomachinery engine of any example herein, and particularly any one of examples 1-12, wherein the F_Span at the redline operating condition is within a range of 100,000-175,000 lbf.

Example 14. The turbomachinery engine of any example herein, and particularly any one of examples 1-12, wherein the F_Span at the redline operating condition is within a range of 50,000-100,000 lbf.

Example 15. The turbomachinery engine of any example herein, and particularly example 14, wherein the F_Span at the redline operating condition is within a range of 65,000-85,000 lbf.

Example 16. The turbomachinery engine of any example herein, and particularly any one of examples 1-15, wherein the F_Area is within a range of 3,000-25,000 $in^2$.

Example 17. The turbomachinery engine of any example herein, and particularly any one of examples 1-16, wherein the F_Area is within a range of 15,000-20,000 $in^2$.

Example 18. The turbomachinery engine of any example herein, and particularly example 17, wherein the F_Area is within a range of 17,000-18,000 $in^2$.

Example 19. The turbomachinery engine of any example herein, and particularly any one of examples 1-16, wherein the F_Area is within a range of 3,000-10,000 $in^2$.

Example 20. The turbomachinery engine of any example herein, and particularly example 18, wherein the F_Area is within a range of 4,000-7,000 $in^2$.

Example 21. The turbomachinery engine of any example herein, and particularly any one of examples 1-20, wherein a fan blade tip speed of the fan assembly at a redline operating condition is within a range of 700-1,400 ft/s.

Example 22. The turbomachinery engine of any example herein, and particularly example 21, wherein the fan blade tip speed of the fan assembly at a redline operating condition is within a range of 800-950 ft/s.

Example 23. The turbomachinery engine of any example herein, and particularly example 21, wherein the fan blade tip speed of the fan assembly at a redline operating condition is within a range of 1,000-1,200 ft/s.

Example 24. The turbomachinery engine of any example herein, and particularly any one of examples 1-23, wherein the gearbox comprises a gear ratio of 4.1-14, wherein the gear ratio is defined by the first rotational speed divided by the second rotational speed.

Example 25. A turbomachinery engine comprises a fan assembly, a core engine, and a gearbox. The fan assembly includes a plurality of variable pitch fan blades, a first VPF parameter, and a second VPF parameter. The first VPF parameter is defined by a fan blade radius ratio (RR) divided by a fan pressure ratio (FPR) at a static sea-level takeoff operating condition. The second VPF parameter is defined by a bearing spanwise force (F_Span) at a redline operating condition measured in pounds force divided by a fan area (F_Area) measured in square inches. The first VPF parameter is within a range of 0.1 to 0.25, and the second VPF parameter is within a range of 2-30 $lbf/in^2$. The core engine includes one or more compressor sections and one or more turbine sections. The gearbox includes an input and an output. The input is coupled to the one or more turbine sections of the core engine and comprises a first rotational speed, and the output is coupled to the fan assembly and has a second rotational speed, which is less than the first rotational speed.

Example 26. The turbomachinery engine of any example herein, and particularly example 25, further comprising a pitch change mechanism coupled to the plurality of variable pitch fan blades and configured for adjusting a pitch of the plurality of variable pitch fan blades.

Example 27. The turbomachinery engine of any example herein, and particularly example 26, wherein the pitch change mechanism is a linear actuated pitch change mechanism.

Example 28. The turbomachinery engine of any example herein, and particularly any one of examples 25-27, wherein the plurality of fan blades is 10-18 fan blades.

Example 29. The turbomachinery engine of any example herein, and particularly any one of examples 25-28, wherein the plurality of fan blades is 12-14 fan blades.

Example 30. The turbomachinery engine of any example herein, and particularly any one of examples 25-29, wherein the plurality of fan blades is exactly 14 fan blades.

Example 31. The turbomachinery engine of any example herein, and particularly any one of examples 25-30, wherein the RR is within a range of 0.125-0.55.

Example 32. The turbomachinery engine of any example herein, and particularly any one of examples 25-31, wherein the RR is within a range of 0.2-0.5.

Example 33. The turbomachinery engine of any example herein, and particularly any one of examples 25-31, wherein the RR is within a range of 0.25-0.35.

Example 34. The turbomachinery engine of any example herein, and particularly any one of examples 25-33, wherein the FPR at the static sea-level takeoff operating condition is within a range of 1.05-1.5.

Example 35. The turbomachinery engine of any example herein, and particularly any one of examples 25-34, wherein the FPR at the static sea-level takeoff operating condition is 1.05-1.15.

Example 36. The turbomachinery engine of any example herein, and particularly any one of examples 25-34, wherein the FPR at the static sea-level takeoff operating condition is within a range of 1.20-1.40.

Example 37. The turbomachinery engine of any example herein, and particularly any one of examples 25-36, wherein the F_Span at the redline operating condition is within a range of 20,000-200,000 lbf.

Example 38. The turbomachinery engine of any example herein, and particularly any one of examples 25-37, wherein the F_Span at the redline operating condition is within a range of 60,000-90,000 lbf.

Example 39. The turbomachinery engine of any example herein, and particularly any one of examples 25-37, wherein the F_Span at the redline operating condition is within a range of 100,000-150,000 lbf.

Example 40. The turbomachinery engine of any example herein, and particularly any one of examples 25-39, wherein the F_Area is within a range of 3,000-25,000 in$^2$.

Example 41. The turbomachinery engine of any example herein, and particularly any one of examples 25-40, wherein the F_Area is within a range of 16,000-18,000 in$^2$.

Example 42. The turbomachinery engine of any example herein, and particularly any one of examples 25-40, wherein the F_Area is within a range of 5,500-6,500 in$^2$.

Example 43. The turbomachinery engine of any example herein, and particularly any one of examples 25-42, wherein a fan blade tip speed of the fan assembly at a redline operating condition is within a range of 800-1,200 ft/s.

Example 44. The turbomachinery engine of any example herein, and particularly any one of examples 25-43, wherein the gearbox comprises a gear ratio of 6:1 to 11:1, and wherein the gear ratio is defined by the first rotational speed divided by the second rotational speed.

Example 45. The turbomachinery engine of any example herein, and particularly any one of examples 25-44, wherein the second VPF parameter is within a range of 2.0-5.25 lbf/in$^2$.

Example 46. The turbomachinery engine of any example herein, and particularly any one of examples 25-44, wherein the second VPF parameter is within a range of 5.25-30 lbf/in$^2$.

Example 47. A turbomachinery engine comprises a fan assembly, a core engine, and a gearbox. The fan assembly includes a plurality of variable pitch fan blades, a first VPF parameter, and a second VPF parameter. The first VPF parameter is defined by a fan blade radius ratio (RR) divided by a fan pressure ratio (FPR) at a static sea-level takeoff operating condition. The second VPF parameter is defined by a bearing spanwise force (F_Span) at a redline operating condition measured in pounds force divided by a fan area (F_Area) measured in square inches. The first VPF parameter is within a range of 0.10 to 0.40, and the second VPF parameter is within a range of 5.25-30 lbf/in$^2$. The core engine includes one or more compressor sections and one or more turbine sections. The gearbox includes an input and an output. The input is coupled to the one or more turbine sections of the core engine and comprises a first rotational speed, and the output is coupled to the fan assembly and has a second rotational speed, which is less than the first rotational speed.

Example 48. The turbomachinery engine of any example herein, and particularly example 47, further comprising a linear actuated pitch change mechanism coupled to the fan assembly and configured for adjusting a pitch of the plurality of variable pitch fan blades.

Example 49. The turbomachinery engine of any example herein, and particularly any one of examples 47-48, wherein the plurality of fan blades is 12-16 fan blades.

Example 50. The turbomachinery engine of any example herein, and particularly any one of examples 47-49, wherein the plurality of fan blades is 12-14 fan blades.

Example 51. The turbomachinery engine of any example herein, and particularly any one of examples 47-50, wherein the RR is within a range of 0.125-0.55.

Example 52. The turbomachinery engine of any example herein, and particularly any one of examples 47-51, wherein the RR is within a range of 0.2-0.5.

Example 53. The turbomachinery engine of any example herein, and particularly any one of examples 47-51, wherein the RR is within a range of 0.25-0.35.

Example 54. The turbomachinery engine of any example herein, and particularly any one of examples 47-53, wherein the FPR at the static sea-level takeoff operating condition is within a range of 1.05-1.5.

Example 55. The turbomachinery engine of any example herein, and particularly any one of examples 47-54, wherein the FPR at the static sea-level takeoff operating condition is within a range of 1.05-1.15.

Example 56. The turbomachinery engine of any example herein, and particularly any one of examples 47-54, wherein the FPR at the static sea-level takeoff operating condition is within a range of 1.2-1.4.

Example 57. The turbomachinery engine of any example herein, and particularly any one of examples 47-56, wherein the F_Span at the redline operating condition is within a range of 20,000-200,000 lbf.

Example 58. The turbomachinery engine of any example herein, and particularly any one of examples 47-57, wherein the F_Span at the redline operating condition is within a range of 140,000-183,000 lbf.

Example 59. The turbomachinery engine of any example herein, and particularly any one of examples 47-57, wherein the F_Span at the redline operating condition is within a range of 50,000-75,000 lbf.

Example 60. The turbomachinery engine of any example herein, and particularly any one of examples 47-59, wherein the F_Area is within a range of 3,500-18,000 in$^2$.

Example 61. The turbomachinery engine of any example herein, and particularly any one of examples 47-60, wherein the F_Area is within a range of 15,000-18,000 in$^2$.

Example 62. The turbomachinery engine of any example herein, and particularly any one of examples 47-60, wherein the F_Area is within a range of 4,000-5,500 in$^2$.

Example 63. The turbomachinery engine of any example herein, and particularly any one of examples 47-62, wherein a fan blade tip speed of the fan assembly at a redline operating condition is within a range of 800-950 ft/s.

Example 64. The turbomachinery engine of any example herein, and particularly any one of examples 47-63, wherein the gearbox comprises a gear ratio of 4.5:1 to 12:1.

Example 65. The turbomachinery engine of any example herein, and particularly any one of examples 47-64, wherein the first VPF parameter is within a range of 0.10 to 0.25.

Example 66. The turbomachinery engine of any example herein, and particularly any one of examples 47-64, wherein the first VPF parameter is within a range of 0.25 to 0.40.

Example 67. The turbomachinery engine of any example herein, further comprising a third stream.

Example 68. A variable pitch fan assembly for a turbomachinery engine can be provided. The variable pitch fan assembly includes a plurality of variable pitch fan blades, a fan blade radius ratio (RR), a fan pressure ratio (FPR) at a static sea-level takeoff operating condition, a bearing spanwise force (F_Span) at a redline operating condition measured in pounds force, and a fan area (F_Area) measured in square inches. The variable pitch fan assembly is configured such that the RR divided by the FPR is within a range of 0.10-0.25 and the F_Span divided by the F_Area is within a range of 2.0-30.0 lbf/in$^2$.

Example 69. The variable pitch fan assembly of any example herein, and particularly example 68, wherein the F_Span divided by the F_Area is within a range of 2-5.25 lbf/in$^2$.

Example 70. The variable pitch fan assembly of any example herein, and particularly example 68, wherein the F_Span divided by the F_Area is within a range of 5.25-30 lbf/in$^2$.

Example 71. A variable pitch fan assembly for a turbomachinery engine can be provided. The variable pitch fan assembly includes a plurality of variable pitch fan blades, a fan blade radius ratio (RR), a fan pressure ratio (FPR) at a static sea-level takeoff operating condition, a bearing spanwise force (F_Span) at a redline operating condition measured in pounds force, and a fan area (F_Area) measured in square inches. The variable pitch fan assembly is configured such that the RR divided by the FPR is within a range of 0.10-0.40 and the F_Span divided by the F_Area is within a range of 5.25-30.0 lbf/in$^2$.

Example 72. The variable pitch fan assembly of any example herein, and particularly example 71, wherein the RR divided by the FPR is within a range of 0.1-0.25.

Example 73. The variable pitch fan assembly of any example herein, and particularly example 71, wherein the RR divided by the FPR is within a range of 0.25-0.40.

Example 74. The variable pitch fan assembly of any example herein, wherein the fan blades are configured to be used with an unducted engine.

Example 75. The variable pitch fan assembly of any example herein, wherein the fan blades are configured to be used with a ducted engine.

Example 76. The variable pitch fan assembly of any example herein, wherein the fan blades are configured to be used with an engine comprising a third stream.

Example 77. A turbomachinery engine comprising a fan assembly, a vane assembly, a core engine, and a gearbox. The fan assembly includes a plurality of variable pitch fan blades, a first VPF parameter, and a second VPF parameter. The first VPF parameter is within a range of 0.10-0.40 and is defined by a fan blade radius ratio (RR) divided by a fan pressure ratio (FPR) at a static sea-level takeoff operating condition. The second VPF parameter 1-30 lbf/in$^2$ and is defined by a bearing spanwise force (F_Span) at a redline operating condition measured in pounds force divided by a fan area (F_Area) measured in square inches. The vane assembly includes a plurality of vanes disposed aft of the plurality of variable pitch fan blades. The core engine includes one or more compressor sections and one or more turbine sections. The gearbox includes an input and an output. The input is coupled to the one or more turbine sections of the core engine and comprises a first rotational speed, and the output is coupled to the fan assembly and has a second rotational speed which is less than the first rotational speed.

Example 78. The turbomachinery engine of any example herein, and particularly example 77, wherein the first VPF parameter is within a range of 0.20 to 0.40.

Example 79. The turbomachinery engine of any example herein, and particularly example 77, wherein the first VPF parameter is within a range of 0.15 to 0.30.

Example 80. The turbomachinery engine of any example herein, and particularly any one of examples 77-79, wherein the second VPF parameter is within a range of 2-30 lbf/in$^2$.

Example 81. The turbomachinery engine of any example herein, and particularly any one of examples 77-79, wherein the second VPF parameter is within a range of 1-5.25 lbf/in$^2$.

Example 82. The turbomachinery engine of any example herein, and particularly any one of examples 77-79, wherein the second VPF parameter is within a range of 2-5.25 lbf/in$^2$.

Example 83. The turbomachinery engine of any example herein, and particularly any one of examples 77-82, further comprising a pitch change mechanism coupled to the plurality of variable pitch fan blades and configured for adjusting a pitch of the plurality of variable pitch fan blades.

Example 84. A turbomachinery engine comprising a fan assembly, a core engine, and a gearbox. The fan assembly includes a plurality of variable pitch fan blades, a first VPF parameter, and a second VPF parameter. The first VPF parameter is within a range of 0.10-0.40 and is defined by a fan blade radius ratio (RR) divided by a fan pressure ratio (FPR) at a static sea-level takeoff operating condition. The second VPF parameter is within a range of 1.0-5.25 lbf/in$^2$ and is defined by a bearing spanwise force (F_Span) at a redline operating condition measured in pounds force divided by a fan area (F_Area) measured in square inches. The core engine includes one or more compressor sections and one or more turbine sections. The gearbox includes an input and an output. The input is coupled to the one or more turbine sections of the core engine and comprises a first rotational speed. The output is coupled to the fan assembly and has a second rotational speed which is less than the first rotational speed.

Example 85. The turbomachinery engine of any example herein, and particularly example 84, further comprising a pitch change mechanism coupled to the plurality of variable pitch fan blades and configured for adjusting a pitch of the plurality of variable pitch fan blades.

Example 86. The turbomachinery engine of any example herein, and particularly example 85, wherein the pitch change mechanism comprises at least one of a linear motion pitch change mechanism, a rotatory motion pitch change mechanism, a hydraulically driven pitch change mechanism, or an electrically driven pitch change mechanism.

Example 87. The turbomachinery engine of any example herein, and particularly example 86, wherein the pitch change mechanism is disposed on an engine centerline axis.

Example 88. The turbomachinery engine of any example herein, and particularly example 86, wherein the pitch change mechanism is offset from an engine centerline axis.

Example 89. The turbomachinery engine of any example herein, and particularly any one of examples 84-88, wherein the first VPF parameter is within a range of 0.20 to 0.40.

Example 90. The turbomachinery engine of any example herein, and particularly any one of examples 84-88, wherein the first VPF parameter is within a range of 0.10 to 0.30.

Example 91. The turbomachinery engine of any example herein, and particularly any one of examples 84-88, wherein the first VPF parameter is within a range of 0.15 to 0.30.

Example 92. The turbomachinery engine of any example herein, and particularly any one of examples 84-88, wherein the first VPF parameter is within a range of 0.10 to 0.25.

Example 93. A turbomachinery engine comprising a fan assembly, a core engine, and a gearbox. The fan assembly includes a plurality of variable pitch fan blades, a first VPF parameter, and a second VPF parameter. The first VPF parameter is within a range of 0.15-0.39 and is defined by a fan blade radius ratio (RR) divided by a fan pressure ratio (FPR) at a static sea-level takeoff operating condition. The second VPF parameter is within a range of 2-27 lbf/in$^2$ and is defined by a bearing spanwise force (F_Span) at a redline operating condition measured in pounds force divided by a fan area (F_Area) measured in square inches. The core engine includes one or more compressor sections and one or more turbine sections. The gearbox includes an input and an output. The input is coupled to the one or more turbine sections of the core engine and comprises a first rotational speed. The output is coupled to the fan assembly and has a second rotational speed which is less than the first rotational speed.

Example 94. The turbomachinery engine of any example herein, and particularly example 93, wherein the fan assembly is disposed within a fan case, wherein the first VPF parameter is within a range of 0.2-0.36, and wherein the second VPF parameter is within a range of 5-27 lbf/in$^2$.

Example 95. The turbomachinery engine of any example herein, and particularly example 93, wherein the fan assembly is an unducted fan assembly, and wherein the second VPF parameter is within a range of 2-4.6 lbf/in$^2$.

Example 96. The turbomachinery engine of any example herein, and particularly any one of examples 93-95, further comprising a pitch change mechanism coupled to the plurality of variable pitch fan blades and configured for adjusting a pitch of the plurality of variable pitch fan blades, and wherein the pitch change mechanism comprises at least one of a linear motion pitch change mechanism, a rotatory motion pitch change mechanism, a hydraulically driven pitch change mechanism, or an electrically driven pitch change mechanism.

Example 97. The turbomachinery engine of any example herein, and particularly any one of examples 77-96, wherein the plurality of variable pitch fan blades is 8-26 fan blades.

Example 98. The turbomachinery engine of any example herein, and particularly any one of examples 77-96, wherein the plurality of variable pitch fan blades is 12-20 fan blades.

Example 99. The turbomachinery engine of any example herein, and particularly any one of examples 77-96, wherein the plurality of variable pitch fan blades is exactly 12 fan blades.

Example 100. The turbomachinery engine of any example herein, and particularly any one of examples 77-96, wherein the plurality of variable pitch fan blades is exactly 14 fan blades.

Example 101. The turbomachinery engine of any example herein, and particularly any one of examples 77-96, wherein the plurality of variable pitch fan blades is exactly 16 fan blades.

Example 102. The turbomachinery engine of any example herein, and particularly any one of examples 77-96 wherein the plurality of variable pitch fan blades is exactly 18 fan blades.

Example 103. The turbomachinery engine of any example herein, and particularly any one of examples 77-96, wherein the plurality of variable pitch fan blades is exactly 20 fan blades.

Example 104. The turbomachinery engine of any example herein, and particularly any one of examples 77-96, wherein the plurality of variable pitch fan blades is exactly 22 fan blades.

Example 105. The turbomachinery engine of any example herein, and particularly any one of examples 77-96, wherein the plurality of variable pitch fan blades is exactly 24 fan blades.

Example 106. The turbomachinery engine of any example herein, and particularly any one of examples 77-105, wherein the one or more compressor sections of the core engine comprises a low-pressure compressor having 1-8 stages and a high-pressure compressor comprising 7-11 stages, and wherein the one or more turbine sections of the core engine comprises a high-pressure turbine comprising 1-2 stages and a low-pressure turbine comprising 3-6 stages.

Example 107. The turbomachinery engine of any example herein, and particularly any one of examples 77-105, wherein the one or more compressor sections of the core engine comprises a low-pressure compressor having 3-5 stages and a high-pressure compressor comprising 9-10 stages, and wherein the one or more turbine sections of the core engine comprises a high-pressure turbine comprising 2 stages and a low-pressure turbine comprising 3-4 stages.

Example 108. The turbomachinery engine of any example herein, and particularly any one of examples 77-105, wherein the one or more turbine sections of the core engine comprises a high-pressure turbine comprising exactly 2 stages and a low-pressure turbine comprising exactly 3 stages.

Example 109. The turbomachinery engine of any example herein, and particularly any one of examples 77-105, wherein the one or more turbine sections of the core engine comprises a high-pressure turbine comprising exactly 2 stages and a low-pressure turbine comprising exactly 4 stages.

Example 110. The turbomachinery engine of any example herein, and particularly any one of examples 77-105 or examples 108-109, wherein the one or more compressor sections of the core engine comprises a high-pressure compressor comprising exactly 8 stages.

Example 111. The turbomachinery engine of any example herein, and particularly any one of examples 77-105 or examples 108-109, wherein the one or more compressor sections of the core engine comprises a high-pressure compressor comprising exactly 9 stages.

Example 112. The turbomachinery engine of any example herein, and particularly any one of examples 77-105 or examples 108-109, wherein the one or more compressor sections of the core engine comprises a high-pressure compressor comprising exactly 10 stages.

Example 113. The turbomachinery engine of any example herein, and particularly any one of examples 77-105 or examples 108-109, wherein the one or more compressor sections of the core engine comprises a high-pressure compressor comprising exactly 11 stages.

Example 114. The turbomachinery engine of any example herein, and particularly any one of examples 77-113, wherein the RR is within a range of 0.16-0.48.

Example 115. The turbomachinery engine of any example herein, and particularly any one of examples 77-113, wherein the RR is within a range of 0.16-0.30.

Example 116. The turbomachinery engine of any example herein, and particularly any one of examples 77-113, wherein the RR is within a range of 0.25-0.48.

Example 117. The turbomachinery engine of any example herein, and particularly any one of examples 77-116, wherein the FPR is within a range of 1.25-1.35.

Example 118. The turbomachinery engine of any example herein, and particularly any one of examples 77-116, wherein the FPR is within a range of 1.07-1.08.

Example 119. The turbomachinery engine of any example herein, and particularly any one of examples 77-116, wherein the FPR is within a range of 1.07-1.35.

Example 120. The turbomachinery engine of any example herein, and particularly any one of examples 77-119, wherein the F_Span is within a range of 37,459-81,293 lbf.

Example 121. The turbomachinery engine of any example herein, and particularly any one of examples 77-119, wherein the F_Span is within a range of 36,626-182,593 lbf.

Example 122. The turbomachinery engine of any example herein, and particularly any one of examples 77-123, wherein the F_Area is within a range of 4,000-7,000 in$^2$.

Example 123. The turbomachinery engine of any example herein, and particularly any one of examples 77-123, wherein the F_Area is within a range of 12,000-25,000 in$^2$.

Example 124. The turbomachinery engine of any example herein, and particularly any one of examples 77-123, wherein the F_Area is within a range of 4,000-25,000 in$^2$.

The invention claimed is:

1. A turbomachinery engine comprising:
a fan assembly including a plurality of variable pitch fan blades, a first VPF parameter, and a second VPF parameter, wherein:
the first VPF parameter is within a range of 0.10-0.40 and is defined by a fan blade radius ratio (RR) divided by a fan pressure ratio (FPR) at a static sea-level takeoff operating condition; and
the second VPF parameter is within a range of 1-30 lbf/in$^2$ and is defined by a bearing spanwise force (F_Span) at a redline operating condition measured in pounds force divided by a fan area (F_Area) measured in square inches;
a vane assembly including a plurality of vanes disposed aft of the plurality of variable pitch fan blades;
a core engine including one or more turbine sections; and
a gearbox including an input and an output, wherein the input is coupled to the one or more turbine sections of the core engine and comprises a first rotational speed, wherein the output is coupled to the fan assembly and has a second rotational speed which is less than the first rotational speed.

2. The turbomachinery engine of claim 1, wherein the first VPF parameter is within a range of 0.20 to 0.40.

3. The turbomachinery engine of claim 1, wherein the first VPF parameter is within a range of 0.15 to 0.30.

4. The turbomachinery engine of claim 1, wherein the second VPF parameter is within a range of 2-30 lbf/in$^2$.

5. The turbomachinery engine of claim 1, wherein the second VPF parameter is within a range of 1-5.25 lbf/in$^2$.

6. The turbomachinery engine of claim 1, wherein the second VPF parameter is within a range of 2-5.25 lbf/in$^2$.

7. The turbomachinery engine of claim 1, further comprising a pitch change mechanism coupled to the plurality of variable pitch fan blades and configured for adjusting a pitch of the plurality of variable pitch fan blades.

8. A turbomachinery engine comprising:
a fan assembly including a plurality of variable pitch fan blades, a first VPF parameter, and a second VPF parameter, wherein:
the first VPF parameter is within a range of 0.10-0.40 and is defined by a fan blade radius ratio (RR) divided by a fan pressure ratio (FPR) at a static sea-level takeoff operating condition; and
the second VPF parameter is within a range of 1.0-5.25 lbf/in$^2$ and is defined by a bearing spanwise force (F_Span) at a redline operating condition measured in pounds force divided by a fan area (F_Area) measured in square inches;
a core engine including one or more turbine sections; and
a gearbox including an input and an output, wherein the input is coupled to the one or more turbine sections of the core engine and comprises a first rotational speed, wherein the output is coupled to the fan assembly and has a second rotational speed which is less than the first rotational speed.

9. The turbomachinery engine of claim 8, further comprising a pitch change mechanism coupled to the plurality of variable pitch fan blades and configured for adjusting a pitch of the plurality of variable pitch fan blades.

10. The turbomachinery engine of claim 9, wherein the pitch change mechanism comprises at least one of a linear motion pitch change mechanism, a rotatory motion pitch change mechanism, a hydraulically driven pitch change mechanism, or an electrically driven pitch change mechanism.

11. The turbomachinery engine of claim 10, wherein the pitch change mechanism is disposed on an engine centerline axis.

12. The turbomachinery engine of claim 10, wherein the pitch change mechanism is offset from an engine centerline axis.

13. The turbomachinery engine of claim 8, wherein the first VPF parameter is within a range of 0.20 to 0.40.

14. The turbomachinery engine of claim 8, wherein the first VPF parameter is within a range of 0.10 to 0.30.

15. The turbomachinery engine of claim 8, wherein the first VPF parameter is within a range of 0.15 to 0.30.

16. The turbomachinery engine of claim 8, wherein the first VPF parameter is within a range of 0.10 to 0.25.

17. A turbomachinery engine comprising:
a fan assembly including a plurality of variable pitch fan blades, a first VPF parameter, and a second VPF parameter, wherein:
the first VPF parameter is within a range of 0.15-0.39 and is defined by a fan blade radius ratio (RR) divided by a fan pressure ratio (FPR) at a static sea-level takeoff operating condition; and
the second VPF parameter is within a range of 2-27 lbf/in$^2$ and is defined by a bearing spanwise force (F_Span) at a redline operating condition measured in pounds force divided by a fan area (F_Area) measured in square inches;
a core engine including one or more turbine sections; and
a gearbox including an input and an output, wherein the input is coupled to the one or more turbine sections of the core engine and comprises a first rotational speed, wherein the output is coupled to the fan assembly and has a second rotational speed which is less than the first rotational speed.

18. The turbomachinery engine of claim 17, wherein the fan assembly is disposed within a fan case, wherein the first VPF parameter is within a range of 0.2-0.36, and wherein the second VPF parameter is within a range of 5-27 lbf/in$^2$.

19. The turbomachinery engine of claim 17, wherein the fan assembly is an unducted fan assembly, and wherein the second VPF parameter is within a range of 2-4.6 lbf/in$^2$.

20. The turbomachinery engine of claim 17, further comprising a pitch change mechanism coupled to the plurality of variable pitch fan blades and configured for adjusting a pitch of the plurality of variable pitch fan blades, and wherein the pitch change mechanism comprises at least one of a linear motion pitch change mechanism, a rotatory motion pitch change mechanism, a hydraulically driven pitch change mechanism, or an electrically driven pitch change mechanism.

* * * * *